(12) United States Patent
Zambetti et al.

(10) Patent No.: US 8,963,519 B2
(45) Date of Patent: Feb. 24, 2015

(54) SWITCHING PULSE-WIDTH MODULATED VOLTAGE REGULATOR AND METHOD OF CONTROLLING A SWITCHING PULSE-WIDTH MODULATED VOLTAGE REGULATOR

(75) Inventors: Osvaldo Enrico Zambetti, Milan (IT); Daniele Giorgetti, Corbetta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 86 days.

(21) Appl. No.: 13/544,780

(22) Filed: Jul. 9, 2012

(65) Prior Publication Data

US 2013/0057240 A1  Mar. 7, 2013

(30) Foreign Application Priority Data

Sep. 5, 2011 (IT) .............................. MI2011A1594

(51) Int. Cl.
*G05F 1/56* (2006.01)
*H02M 3/156* (2006.01)
*H02M 3/158* (2006.01)

(52) U.S. Cl.
CPC ............ *H02M 3/156* (2013.01); *H02M 3/1584* (2013.01)
USPC ......................................... 323/271; 323/279

(58) Field of Classification Search
USPC ......... 323/222, 235, 237, 365–268, 272, 279, 323/282–290, 901; 363/53, 65, 86, 87, 89, 363/81, 125, 127, 56
See application file for complete search history.

(56) References Cited

U.S. PATENT DOCUMENTS

| 4,347,474 | A | * | 8/1982 | Brooks et al. ................. 323/224 |
| 5,319,536 | A | * | 6/1994 | Malik .............................. 363/65 |
| 5,559,423 | A | | 9/1996 | Harman |
| 5,603,138 | A | * | 2/1997 | Bonis ........................... 15/220.1 |
| 6,137,702 | A | * | 10/2000 | Hall et al. ........................ 363/95 |

(Continued)

FOREIGN PATENT DOCUMENTS

| EP | 1 696 215 A1 | 8/2006 |
| KR | 10-2008-0022799 A | 3/2008 |

(Continued)

OTHER PUBLICATIONS

Julsereewong et al, "Buck Converter Controlled by Using Variable Switching Frequency Technique", Electron Devices and Solid-State Circuits, 2008. EDSSC 2008. IEEE International Conference on, IEEE, Piscataway, NJ, USA, Dec. 8, 2008 pp. 1-4.

(Continued)

*Primary Examiner* — Adolf Berhane
*Assistant Examiner* — Nusrat Quddus
(74) *Attorney, Agent, or Firm* — Seed IP Law Group PLLC

(57) ABSTRACT

A switching voltage regulator includes a comparison module configured to receive a reference voltage and a feedback voltage and to generate a comparison signal based on a difference between the reference voltage and the feedback voltage, and a control module configured to generate a gain control threshold signal based on at least one of the reference voltage and the feedback voltage. The control module may be configured to control a duration of a PWM pulse based on the at least one of the reference voltage and the feedback voltage. The feedback voltage may a regulated output voltage of the switching voltage regulator. The switching voltage regulator may be implemented in an analog or a digital manner.

29 Claims, 18 Drawing Sheets

(56) References Cited

U.S. PATENT DOCUMENTS

| | | | |
|---|---|---|---|
| 6,362,608 B1 | 3/2002 | Ashburn et al. | |
| 6,483,383 B2 | 11/2002 | Wu | |
| 6,759,893 B2 | 7/2004 | Gailhard et al. | |
| 7,057,381 B2 * | 6/2006 | Harriman et al. | 323/285 |
| 7,061,215 B2 * | 6/2006 | Harris | 323/268 |
| 7,274,174 B2 | 9/2007 | Wang et al. | |
| 7,279,875 B2 * | 10/2007 | Gan et al. | 323/282 |
| 7,679,350 B2 * | 3/2010 | Falvey et al. | 323/284 |
| 7,796,411 B2 * | 9/2010 | Jin et al. | 363/89 |
| 8,102,164 B2 * | 1/2012 | Colbeck et al. | 323/282 |
| 8,237,376 B2 * | 8/2012 | Franco | 315/291 |
| 2002/0190734 A1 | 12/2002 | Burt et al. | |
| 2003/0111984 A1 | 6/2003 | Isham | |
| 2005/0184717 A1 | 8/2005 | Walters | |
| 2007/0108954 A1 | 5/2007 | Qiu et al. | |
| 2007/0229048 A1 | 10/2007 | Zambetti et al. | |
| 2008/0024104 A1 | 1/2008 | Yamada | |
| 2008/0129259 A1 | 6/2008 | Endo et al. | |
| 2009/0001952 A1 * | 1/2009 | Chang et al. | 323/280 |
| 2009/0257164 A1 | 10/2009 | Ikeuchi et al. | |
| 2010/0079127 A1 | 4/2010 | Grant | |
| 2010/0191980 A1 * | 7/2010 | Malzahn et al. | 713/189 |
| 2010/0231190 A1 * | 9/2010 | Falvey et al. | 323/284 |
| 2010/0315052 A1 | 12/2010 | Zambetti et al. | |
| 2012/0153869 A1 * | 6/2012 | Sadwick et al. | 315/307 |
| 2012/0161741 A1 | 6/2012 | Zambetti | |
| 2013/0293210 A1 * | 11/2013 | Smith et al. | 323/282 |

FOREIGN PATENT DOCUMENTS

| | | |
|---|---|---|
| WO | 94/06030 A1 | 3/1994 |
| WO | 99/50731 A1 | 10/1999 |

OTHER PUBLICATIONS

Pengfei et al, "A 90 240 MHz Hysteretic Controlled DC-DC Buck Converter with Digital Phase Locked Loop Synchronization", IEEE Journal of Solid-State Circuits, IEEE Service Center, Piscataway, NJ, USA, vol. 46, No. 9, Sep. 1, 2011.

* cited by examiner

SWITCHING PULSE-WIDTH MODULATED VOLTAGE REGULATOR AND METHOD OF CONTROLLING A SWITCHING PULSE-WIDTH MODULATED VOLTAGE REGULATOR

BACKGROUND

1. Technical Field

This disclosure relates to switching voltage regulators and more particularly to architectures of feedback voltage regulators, for example, to supply microprocessors.

2. Description of the Related Art

CPUs for PCs, workstations and servers typically need very sophisticated supply control mechanisms. These power supplies typically must meet high precision requirements both in stand-by conditions as well as in conditions of load transients. These requirements led to identify the well known architectures of multi-phase buck regulators as the most appropriate to this objective.

In order to effectively respond to very fast and large load transients (for CPU, up to 100 A in 50 ns) these converters typically employ nonlinear controls that are enabled in presence of load transients and turn on simultaneously all the available phases for sustaining the output voltage. These nonlinear systems advantageously reduce the response time by reacting in an "aggressive" manner to the load transient. Moreover, the multi-phase topologies typically have control mechanisms for limiting the unbalancing of phase currents thus facilitating thermal balancing and preventing excessive stresses of components of the power stage (power MOS and inductors).

A basic block diagram of a typical three-phase buck system, disclosed in U.S. Patent application US2012/0161741, is shown in FIG. 1.

With the evolution of microprocessors and the needs of power saving, also load requirements of microprocessors have changed. In the past, it was assumed that the worst case response was the response with the maximum load step and with the minimum current rise time. Nowadays, microprocessors are allowed to have short load transients with various load steps and with various rise times (Trise). In presence of these small load requests, controllers of the output voltage ideally should provide the same precision and the same efficiency as for full load responses.

Nonlinear systems are affected by drawbacks during these small load requests. Indeed, they typically have a fixed triggering threshold and may abruptly turn on all the available phases of the controller. Therefore, nonlinear systems may not act when the load request is small in respect to the threshold or may act such to make the system respond in an aggressive fashion by turning on all the phases even when it was not necessary. The effect of this nonlinear control is even more evident when the load requests are close to the triggering threshold of the nonlinear system. In these cases, the nonlinear system may respond or even not react at all to small variations giving an undesired response of the load transient. In tests carried out in these conditions, with repeated load transients, large swings of the output voltage exceeding specifications of the regulated voltage were allowed.

There are different solutions for adapting the speed and the response to load transients.

Control methods for adapting the response to load transients are implemented by the so-called COT (Constant-On-Time) voltage regulators, that are regulators in which the on time of switches is constant. As it is well known, in these controllers, the high side MOS is turned on for a defined time determined by a combination of the output voltage VOUT, of the input voltage VIN and of the switching frequency FSW.

Classic constant-on-time voltage regulators that use a comparator for determining the turn on time, are burdened by noise on the feedback line that cause jitter that may exceed the limits fixed by specifications. Moreover, in high frequency designs, with a purely ceramic output capacitive filter, they typically employ the use of a function called "Virtual ESR" that uses the information about the phase current for amplifying the information ripple available at the comparator. Sometimes the signal-to-noise ratio of the ripple of the phase current may cause the same effects caused by jitter as mentioned above.

The published patent application US 2005/0184717 discloses a voltage regulator—shown in FIG. 2—that uses the error amplifier EA for increasing or decreasing the nominal switching frequency of the system, given by $I_{OSC}$. At each clock pulse generated by the oscillator, the system turns on the phase of the regulator for a fixed duration (constant TON). When the system is stable, the mean output current of the error amplifier EA is null; when a load is added, the output drops and the output current of the error amplifier increases thus causing an increase also of the turn on frequency of the system. If the output of the system increases in respect to the regulated value, for example during a load decrease, the current of the error amplifier becomes negative and thus the frequency of the system decreases. In this prior document, the error amplifier is used for increasing or decreasing the switching frequency during transients. If the generated on time TON is not the correct time for a regulation with the nominal switching frequency, the amplifier may saturate (remain clamped down by the block CLAMP) and may try to correct the switching frequency. In this case it would contribute to the regulation by bypassing the compensation network of the terminal COMP and the stability of the system would be compromised.

The published patent application US 2008/0024104 discloses a constant-on-time voltage regulator—shown in FIG. 3, having a control circuit implementing a pulse-frequency modulation (PFM) control using a voltage-controlled oscillator (VCO). The loop gain, and thus the stability of the system, depends on the regulated voltage to be delivered.

In power supply systems for microprocessors, in which the reference voltage may often vary for adapting the supply voltage to changed working conditions of the microprocessor, instability problems may arise.

BRIEF SUMMARY

In an embodiment, an architecture of a switching voltage regulator has a loop gain independent from the regulated output voltage and capable of generating a regulated output voltage accurately tracking a reference input voltage. An embodiment employs a VCO, the gain of which is adjusted in function of a control voltage corresponding either to the regulated output voltage or to the reference input voltage of the regulator.

In an embodiment, the regulator comprises a feedback impedance between an output terminal of the regulator and a feedback terminal and an integration impedance connected between the feedback terminal FB and the comparison terminal COMP.

In an embodiment, a multi-phase voltage regulator comprises a state machine adapted to distribute, in a frequency division mode, the clock pulses generated by the VCO to the circuits that drive the phase inductors.

In an embodiment, a switching voltage regulator comprises: an error amplifier adapted to receive on an input terminal a reference voltage and on another input terminal a feedback voltage available on a feedback terminal of the regulator, and to generate on a comparison terminal a comparison voltage corresponding to the difference between the reference voltage and the feedback voltage; a voltage controlled oscillator coupled to the comparison terminal, adapted to generate a train of pulses at a frequency determined by said comparison voltage; a generator of PWM pulses of controlled duration, synchronous with the pulses of said train of pulses, connected to control a PWM power stage adapted to supply a phase winding of the regulator adapted to generate a regulated output voltage on an output terminal, wherein said voltage controlled oscillator has a gain adjustable by a second control voltage corresponding either to said regulated output voltage or to said reference voltage; and the duration of said PWM pulses is determined either by said regulated output voltage or by said reference voltage. In an embodiment, the voltage regulator comprises an integrating impedance connected between said feedback terminal and said comparison terminal and a feedback impedance connected between said output terminal and said feedback terminal. In an embodiment, the voltage regulator comprises a start-up circuit of said voltage controlled oscillator adapted to generate said second control voltage equal to a minimum voltage when either said regulated output voltage or said reference voltage are smaller than said minimum value, and to either said regulated output voltage or to said reference voltage when both are greater than said minimum value. In an embodiment, the voltage regulator comprises: a plurality of N identical phase windings connected in common to said output terminal of the regulator; as many N identical PWM power stages each being adapted to supply a phase winding of the voltage regulator in function of respective PWM pulses; as many N identical generators of said PWM pulses of duration determined either by said regulated output voltage or by said reference voltage and synchronous with the pulses of said train of pulses; a state machine input with the train of pulses generated by said voltage controlled oscillator, adapted to generate for each of said generators of PWM pulses a respective train of pulses obtained by frequency division by N of said input train of pulses.

In an embodiment, an accumulator on the output of the compensation filter is used to determine the switching frequency of a digital system with constant TON by the use of a programmable structure, dependent on VOUT (or VREF) and on the FSW. In an embodiment, a startup value for a threshold of the accumulator is employed.

In an embodiment, a switching voltage regulator, comprises: a comparison module configured to receive a reference voltage and a feedback voltage and to generate a comparison signal based on a difference between the reference voltage and the feedback voltage; at least one pulse-width modulated (PWM) power stage; and a control module configured to: generate a gain control threshold signal based on at least one of the reference voltage and the feedback voltage; and control the at least one PWM power stage based at least in part on the comparison signal and on the gain control threshold signal. In an embodiment, wherein the control module is configured to control a duration of a PWM pulse based on the at least one of the reference voltage and the feedback voltage. In an embodiment, the feedback voltage is a regulated output voltage of the switching voltage regulator. In an embodiment, the comparison signal is a comparison voltage and the comparison module comprises an error amplifier configured to receive the reference voltage and the feedback voltage and to generate the comparison voltage. In an embodiment, the control module comprises: a voltage controlled oscillator configured to generate a train of pulses at a frequency determined by said comparison voltage and having a gain based on the gain control threshold signal. In an embodiment, the control module further comprises a generator of PWM pulses configured to drive the at least one PWM power stage and a duration of the PWM pulses generated is based on the at least one of the reference voltage and the feedback voltage. In an embodiment, the switching voltage regulator comprises a feedback impedance coupled between an output terminal of the regulator and a feedback terminal of the error amplifier, and an integrating impedance coupled between the feedback terminal and an output terminal of the error amplifier. In an embodiment, the control module comprises a start-up block configured to receive the at least one of the reference voltage and the feedback voltage and to provide the gain control threshold signal to the voltage controlled oscillator, the gain control threshold signal being a largest of a minimum triggering threshold signal and the at least one of the reference voltage and the feedback voltage. In an embodiment, the at least one PWM power stage comprises a plurality of PWM power stages; the feedback voltage is a regulated output voltage of the switching voltage regulator; the comparison signal is a comparison voltage and the comparison module includes an error amplifier configured to receive the reference voltage and the feedback voltage and to generate the comparison voltage; and the control module includes: a voltage controlled oscillator configured to generate a train of pulses at a frequency determined by said comparison voltage and having a gain based on the gain control threshold signal; a plurality of PWM pulse generators configured to generate PWM pulses to drive respective PWM power stages of the plurality of PWM power stages wherein a duration of the PWM pulses is based on the at least one of the reference voltage and the feedback voltage; a start-up block configured to receive the at least one of the reference voltage and the feedback voltage and to provide the gain control threshold signal to the voltage controlled oscillator, the gain control threshold signal being a largest of a minimum triggering threshold signal and the at least one of the reference voltage and the feedback voltage; and a state machine configured to receive the train of pulses generated by said voltage controlled oscillator and to generate for each of said PWM pulse generators a respective train of pulses obtained by frequency division of said train of pulses generated by the voltage controlled oscillator. In an embodiment, the at least one PWM power stage comprises a plurality of PWM power stages each having a PWM pulse generator; the comparison module comprises: a first analog-to-digital converter configured to receive the reference voltage and the feedback voltage; and a first proportional-integral-derivative (PID) controller configured to receive an output of the first analog-to-digital converter and to generate the comparison signal; and the control module comprises: an accumulator configured to generate a train of pulses at a frequency based on the comparison signal, wherein the gain control threshold signal is a tripping threshold of the accumulator; and an interleaving oscillator configured to generate a plurality of pulse trains based on the train of pulses generated by the accumulator. In an embodiment, the PWM pulse generators are configured to generate PWM pulses having a duration based on the at least one of the reference voltage and the feedback voltage. In an embodiment, the gain control reference signal is proportional to the at least one of the reference voltage and the feedback voltage. In an embodiment, the control module comprises a parameter generator configured to receive the reference voltage and to output the gain control threshold signal. In an embodiment, the parameter generator is configured to output a pulse duration control signal based on the reference voltage signal. In an embodiment, the control module comprises: a second analog-to-digital converter configured to receive the feedback voltage and to generate a control signal based on the feedback voltage; and a parameter generator configured to receive the control signal generated by the second analog-to-digital converter and to output the gain control threshold signal. In an embodiment, the parameter generator is configured to output a pulse duration control signal based on the control signal generated by the second analog-to-digital converter. In an embodiment, the gain control threshold signal is a largest of a minimum triggering threshold signal and the at least one of the reference voltage and the feedback voltage.

In an embodiment, a method comprises: generating a regulated voltage which tracks a reference voltage using a constant-on-time switching voltage regulator, by: generating a comparison signal based on the reference voltage and a feedback voltage; generating a gain control threshold signal based on at least one of the reference voltage and the feedback voltage; and controlling the voltage regulator based at least in part on the comparison signal and on the gain control threshold signal. In an embodiment, the controlling the voltage regulator comprises: controlling a duration of pulse width modulated (PWM) pulses based on the at least one of the reference voltage and the feedback voltage. In an embodiment, the feedback voltage is the regulated output voltage of the switching voltage regulator. In an embodiment, the method comprises: generating a train of pulses at a frequency based on the comparison signal using a voltage controlled oscillator having a gain based on the gain control threshold signal; and generating a plurality of PWM pulses to drive respective PWM power stages of the switching voltage regulator, wherein a duration of the PWM pulses is based on the at least one of the reference voltage and the feedback voltage. In an embodiment, generating the gain control threshold signal comprises selecting a largest of a minimum triggering threshold signal and the at least one of the reference voltage and the feedback voltage. In an embodiment, the voltage regulator comprises, a first analog-to-digital converter configured to receive the reference voltage and the feedback voltage; a first proportional-integral-derivative (PID) controller configured to receive an output of the first analog-to-digital converter and to generate the comparison signal; and an accumulator configured to generate a train of pulses at a frequency based on the comparison signal, wherein the generating the gain control threshold signal comprises generating a tripping threshold of the accumulator.

In an embodiment, a system comprises: a processor; and a switching voltage regulator configured to provide power to the processor and including: means for generating a comparison signal based on a reference voltage and a feedback voltage; and means for generating a gain control threshold signal based on at least one of the reference voltage and the feedback voltage. In an embodiment, the switching voltage regulator comprises means for generating a pulse width modulated (PWM) pulse duration control signal based on the at least one of the reference voltage and the feedback voltage. In an embodiment, the feedback voltage is a regulated output voltage of the switching voltage regulator. In an embodiment, the switching voltage regulator comprises a plurality of PWM power stages and a voltage controlled oscillator having a gain based on the gain control threshold signal; and the comparison signal is a comparison voltage and the means for generating the comparison signal includes an error amplifier configured to receive the reference voltage and the feedback voltage and to generate the comparison voltage. In an embodiment, the means for generating the gain control threshold signal is configured to receive the at least one of the reference voltage and the feedback voltage and to provide the gain control threshold signal to a voltage controlled oscillator, the gain control threshold signal being a largest of a minimum triggering threshold signal and the at least one of the reference voltage and the feedback voltage. In an embodiment, the switching voltage regulator comprises: a plurality of PWM power stages each having a PWM pulse generator; a first analog-to-digital converter configured to receive the reference voltage and the feedback voltage; a first proportional-integral-derivative (PID) controller configured to receive an output of the first analog-to-digital converter and to generate the comparison signal; an accumulator configured to generate a train of pulses at a frequency based on the comparison signal, wherein the gain control threshold signal is a tripping threshold of the accumulator; and an interleaving oscillator configured to generate a plurality of pulse trains based on the train of pulses generated by the accumulator.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, inductors, state machines, error amplifiers, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In an embodiment, a voltage regulator uses an error amplifier with a compensation network that may be designed to curb stability issues of the system, and a VCO with adjustable gain that determines the switching frequency.

In an embodiment, the voltage regulator sets the switching frequency of the system, in steady-state or transient condition, according to the information coming from the error amplifier EA, using a VCO the gain of which is adjusted in function of either the regulated output voltage VOUT or the reference voltage VREF. In an embodiment, a switching frequency is generated according to the error signal by choosing appropriately the triggering threshold of the oscillator and the conversion factors of the on-time TON and the frequency of the VCO, which facilitates realizing a switching voltage regulator of adjustable frequency, which is reactive during positive and negative load transients without saturating the error amplifier and thus without compromising the stability of the system, ensuring constancy of the loop gain for any regulated value.

Figure 4:
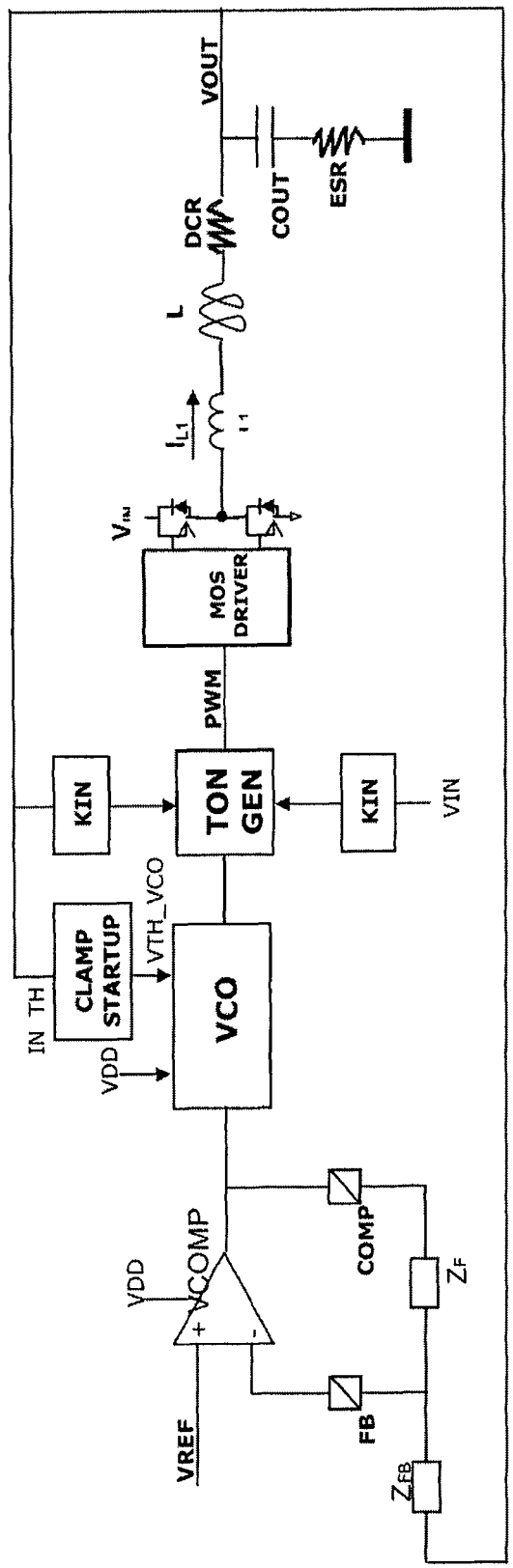
FIG. 4 shows an embodiment of an architecture of a monophase voltage regulator in which the gain of the VCO is adjusted in function of the output voltage VOUT.
Figure 5:
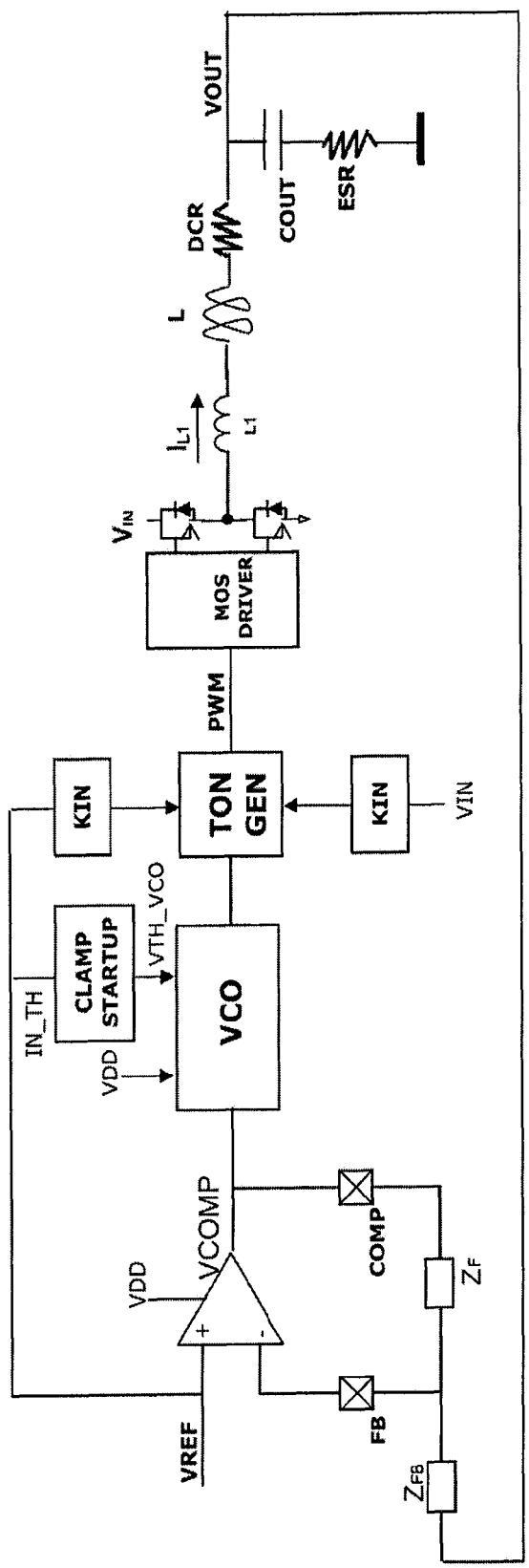
FIG. 5 shows an embodiment of an architecture of a monophase voltage regulator wherein the gain of the VCO is adjusted in function of the reference voltage VREF.

Example embodiments of a regulator are shown in FIGS. 4 and 5.

Differently from the regulator disclosed in US 2008/0024104, the gain of the VCO is adjustable with the signal VTH_VCO, that may be generated such to correspond either to the output voltage VOUT of the regulator or to the reference voltage VREF, and the voltage provided to the VCO is substantially a filtered replica of the output voltage VOUT.

The structure of FIG. 4 may be employed, for example, when the voltage VOUT differs from VREF. In these cases, a scale factor smaller than or equal to 1 may be introduced in the feedback network for regulating to a voltage equal to:

$$V_{OUT} = \frac{V_{REF}}{K_{OUT}}$$

If VOUT is equal to VREF (minus a programmed "droop" effect), the preferred architecture may be that of FIG. 5 because the system may be less sensitive to switching noise (normally present on VOUT) and to output fluctuations due to load transients.

Compared to a known COT (Constant-on-time) regulator, an advantage of having a compensation network and a VCO with a comparator is that disturbances on the feedback network may be filtered by the compensation network. Moreover, the information for determining the turn on instant is not the valley of the output ripple but the mean value of the whole output. Thus disturbances may be further filtered out.

In order to better understand the functioning of an embodiment, it may be convenient to focus on the generation of the on time TON, that is the duration of the turn-on time of the high side power MOSFET at each clock pulse of the system.

Typically, the generation of the turn on time TON follows the general law of regulation of the regulator, in this case a buck regulator:

$$T_{ON} = \frac{V_{OUT}}{V_{IN}} \cdot T_{SW}$$

Figure 6:
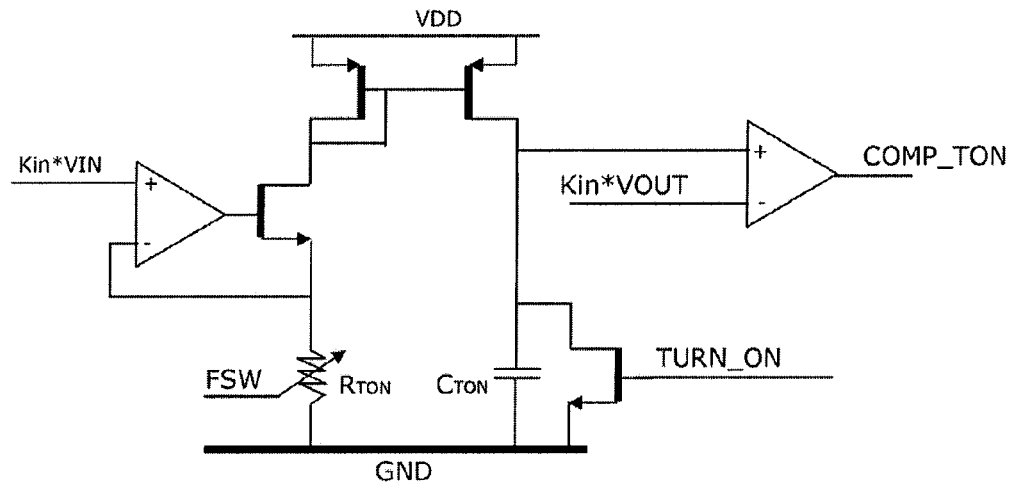
FIGS. 6 and 7 show embodiments of circuits adapted to fix the turn on time TON for the regulators of FIGS. 4 and 5.
Figure 7:
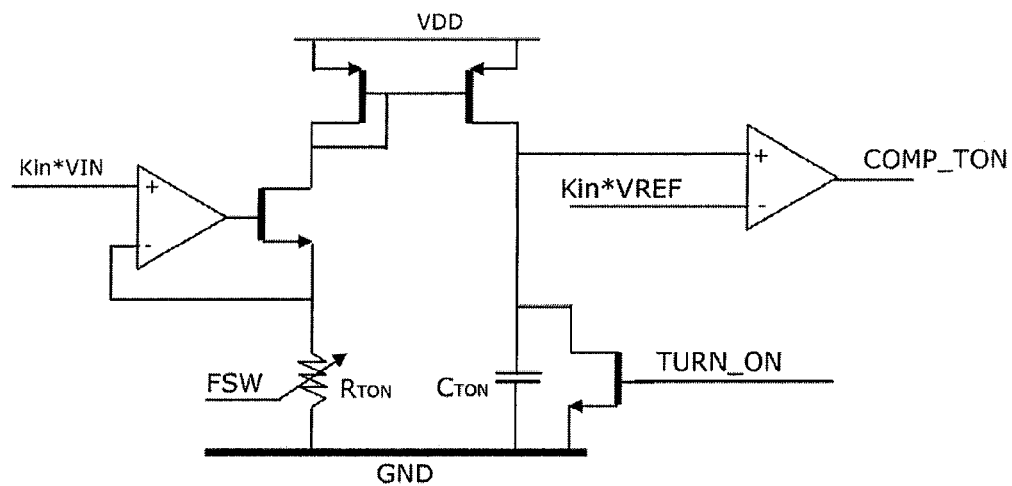

In order to implement this function, it is possible, for example, to use the circuit of FIG. 6 or 7 depending on whether the architecture of FIG. 4 or 5 is used, respectively, wherein:

KIN is a scale factor smaller than or equal to 1 of the input and of the output voltage for adapting the voltages to a range that may be accepted by the circuit;

RTON is a programmable resistance in function of the desired switching frequency for satisfying the equation:

$$R_{TON} \cdot C_{TON} = T_{SW}$$

being CTON a capacitance that, together with the resistance RTON, determines the switching period TSW;

TURN_ON is the phase turn on signal: when the VCO generates a clock pulse, the logic circuitry, unless protection events are triggered, generates a TURN_ON signal;

COMP_TON is a signal that, when its value is 1, determines the turning on of the high side MOS.

In this case, the following equations may be written for the architectures of FIG. 4:

$$T_{ON} = \frac{V_{OUT}}{V_{IN}} \cdot R_{TON} \cdot C_{TON}$$

and of FIG. 5

$$T_{ON} = \frac{V_{REF}}{V_{IN}} \cdot R_{TON} \cdot C_{TON}$$

respectively.

Figure 8:
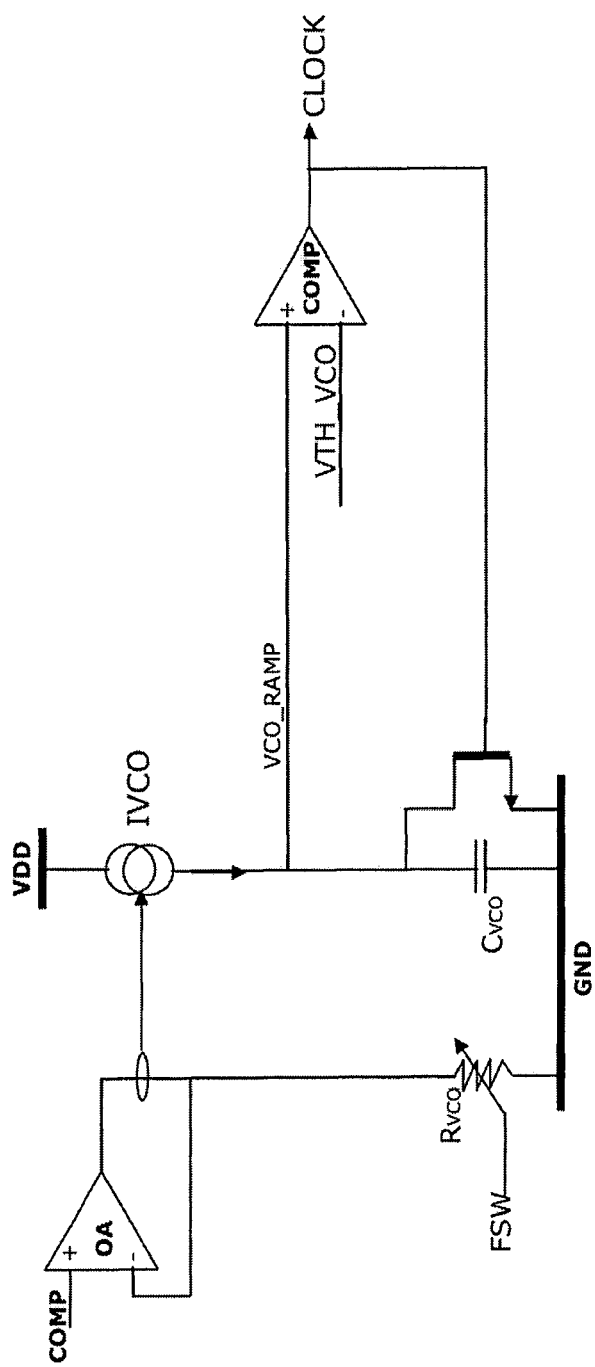
FIG. 8 shows a basic architecture of an embodiment of a VCO.

If at each clock pulse the system turns on for a time interval equal to TON, the output of the error amplifier EA is brought to a value such that the VCO starts oscillating at a frequency equal to 1/TSW for satisfying the regulation law of the buck regulator, as usual in this field. In an embodiment, it may be desirable to act to make the gain of the system remain constant when the reference value varies, e.g., such that a certain variation of VOUT corresponds to a variation of the voltage of VCOMP. The basic architecture of an embodiment of a VCO is illustrated in FIG. 8 wherein OA is an operational amplifier, $I_{VCO}$ is a current generator that replicates throughout the capacitance $C_{VCO}$ the current flowing throughout the resistance $R_{VCO}$, VCO_RAMP represents the signal of the ramp voltage available on the capacitance $C_{VCO}$ and VTH_VCO represents the triggering threshold of the VCO coming from the block CLAMP_STARTUP.

The output voltage of the error amplifier (COMP) is converted to a current through an operational amplifier and a resistance. The current flowing throughout the resistance $R_{VCO}$ is read and injected through the capacitance $C_{VCO}$ of the oscillator of the VCO. The capacitance $C_{VCO}$ integrates the current and generates the voltage VCO_RAMP. When the voltage VCO_RAMP attains the voltage VTH_VCO, the output of the comparator switches and generates a clock pulse that resets again the capacitance $C_{VCO}$ and thus the signal VCO_RAMP.

In order to start the system, at the start-up when the output voltage VOUT is null, a voltage VTH_VCO is supplied at a level acceptable by the input dynamics of the comparator and such to make the output of the comparator switch and to generate, if needed, a clock pulse.

Figure 9:
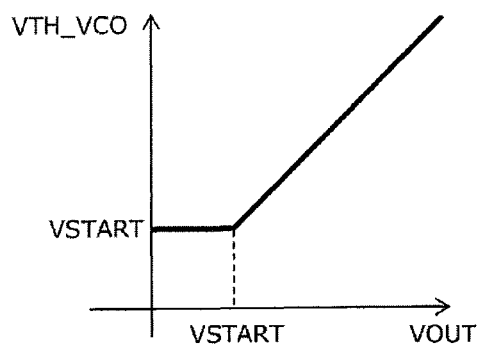
FIGS. 9 and 10 show ideal characteristics of embodiments of the circuit CLAMP STARTUP of the regulators of FIG. 4 and of FIG. 5.
Figure 10:
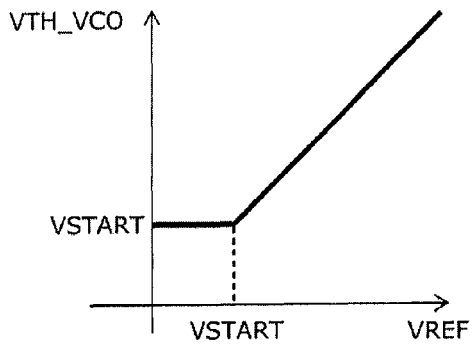

The circuit CLAMP_STARTUP is useful for starting up the oscillator when its triggering threshold is null, that is at the start-up of the system. The voltage VTH_VCO thus represents the voltage VOUT or VREF (depending on the used topology) when VOUT or VREF is greater than a certain value VSTART (for example 300 mV that could represent the minimum regulation value), as shown in FIGS. 9 and 10.

Figure 11:
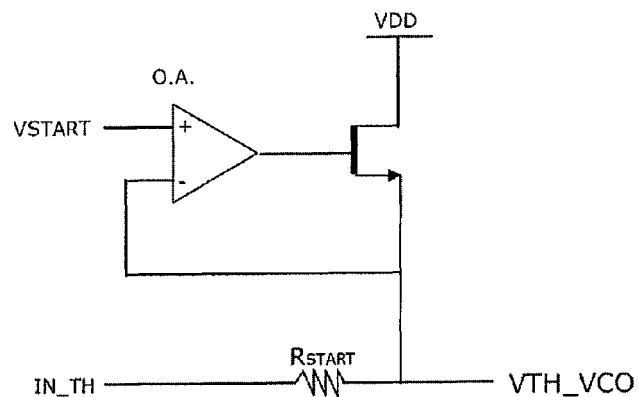
FIGS. 11 and 12 show embodiments of architectures that may be employed as a CLAMP STARTUP circuit of an embodiment.
Figure 12:
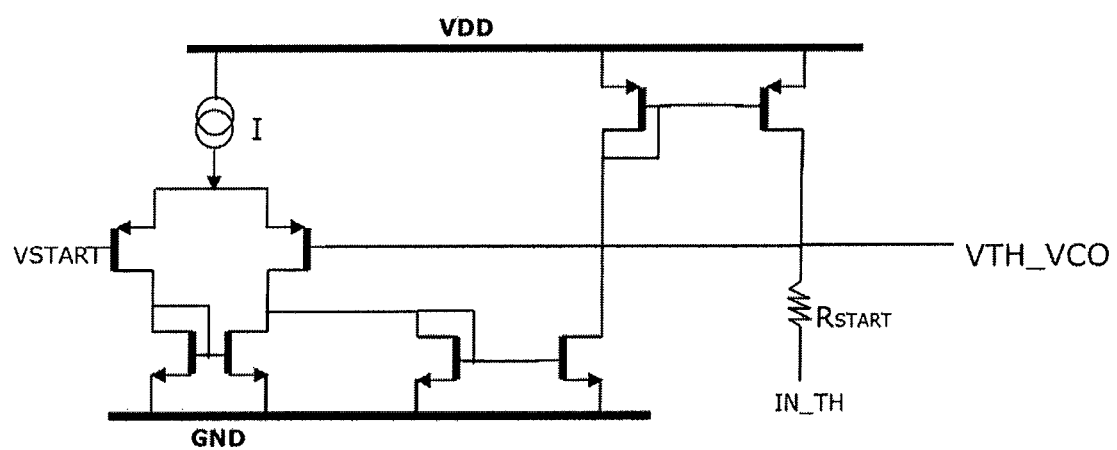

Examples of realization of the CLAMP_STARTUP are represented in FIGS. 11 and 12, wherein VSTART represents the lower clamp voltage of the voltage VTH_VCO, OA is an operational amplifier, M1 is a NMOS, RSTART is a gain resistance, IN_TH is the input of the CLAMP_STARTUP (that could be the voltage VOUT or VREF depending on whether the architecture of FIG. 4 or of FIG. 5 is used) and VTH_VCO is the output and represents the triggering threshold of the comparator of the VCO.

Referring to FIG. 11, when IN_TH is smaller than or equal to VSTART, minus an offset of the operational amplifier, the circuit keeps equal the voltages at the inputs of the operational amplifier because M1 is crossed by a current such to make the voltage VTH_VCO equal to VSTART. When IN_TH>VSTART, the circuit RSTART, OA and M1 is not capable of absorbing the current that would flow throughout RSTART if VTH_VCO was equal to VSTART, and thus the MOS M1 is off and the voltage VTH_VCO tracks IN_TH.

The functioning of the circuit of FIG. 12 is similar to that of FIG. 11. If the voltage IN_TH is smaller than the voltage VSTART, the voltage VTH_VCO is equal to the voltage VSTART because the current that flows throughout the resistance RSTART is delivered by the transistor of the current mirror to which RSTART is connected. By contrast, if the voltage IN_TH exceeds the voltage VSTART, the whole bias current I of the amplifier on the left side flows throughout the transistor controlled by VSTART, thus the current mirrors are off and the voltage VTH_VCO tracks the voltage IN_TH.

The law that determines the switching period TSW in function of the voltage on the terminal COMP for the architecture of FIG. 4 is:

$$T_{SW} = \frac{V_{OUT}}{V_{COMP}} \cdot R_{VCO} \cdot C_{VCO}$$

and for the architecture of FIG. 5 is $$T_{SW} = \frac{V_{REF}}{V_{COMP}} \cdot R_{VCO} \cdot C_{VCO}$$

The transfer function from the signal COMP to the signal PWM, that represent the duty cycle information, is:

$$\frac{PWM}{V_{COMP}} = \frac{T_{ON}}{V_{COMP} \cdot T_{SW}} = \frac{R_{VCO} \cdot C_{VCO}}{V_{IN} \cdot R_{TON} \cdot C_{TON}}$$

From this relation the inventors noticed that the gain is independent from the regulation (reference) voltage value, but it still depends on the chosen value of the switching frequency. In order to nullify also this dependence, it is imposed:

$$R_{VCO} \cdot C_{VCO} = k \cdot R_{TON} \cdot C_{TON}$$

wherein k is a generic gain factor. Therefore:

$$\frac{PWM}{V_{COMP}} = \frac{k}{V_{IN}}$$

The gain of the system does not depend upon the input voltage $V_{IN}$, because the above relation is multiplied by the gain of the power stage of FIG. 4 or 5, represented by the two power MOSFETs, that is equal to VIN. With this technique, the loop gain GLOOP of the system is:

$$GLOOP = \frac{V_{COMP}}{V_{OUT}} \cdot \frac{PWM}{V_{COMP}} \cdot \frac{V_{OUT}}{PWM} = -k \cdot \frac{Z_F}{Z_{FB}}$$

Figure 13:
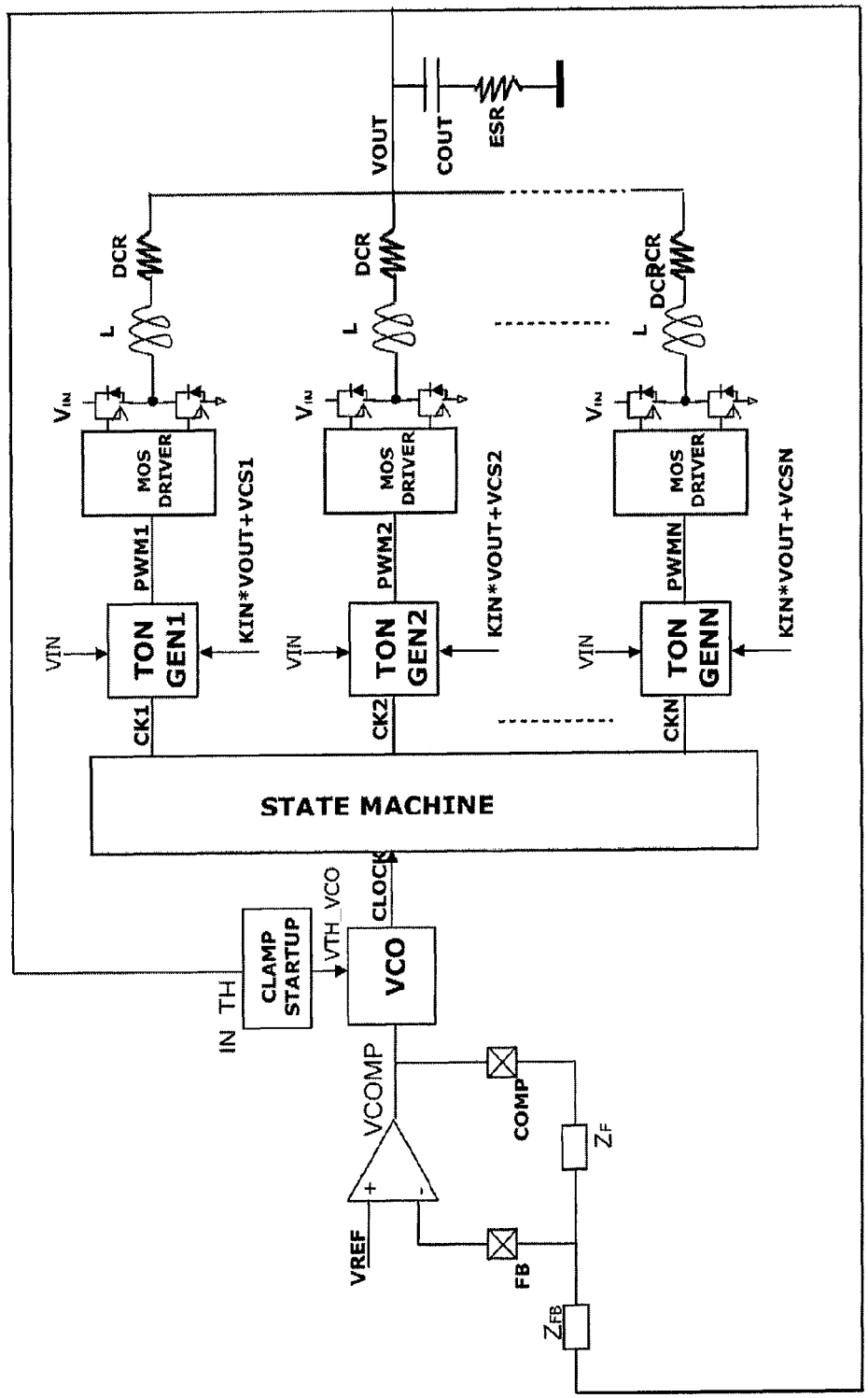
FIGS. 13 and 14 show embodiments of architectures of multiphase voltage regulators.
Figure 14:
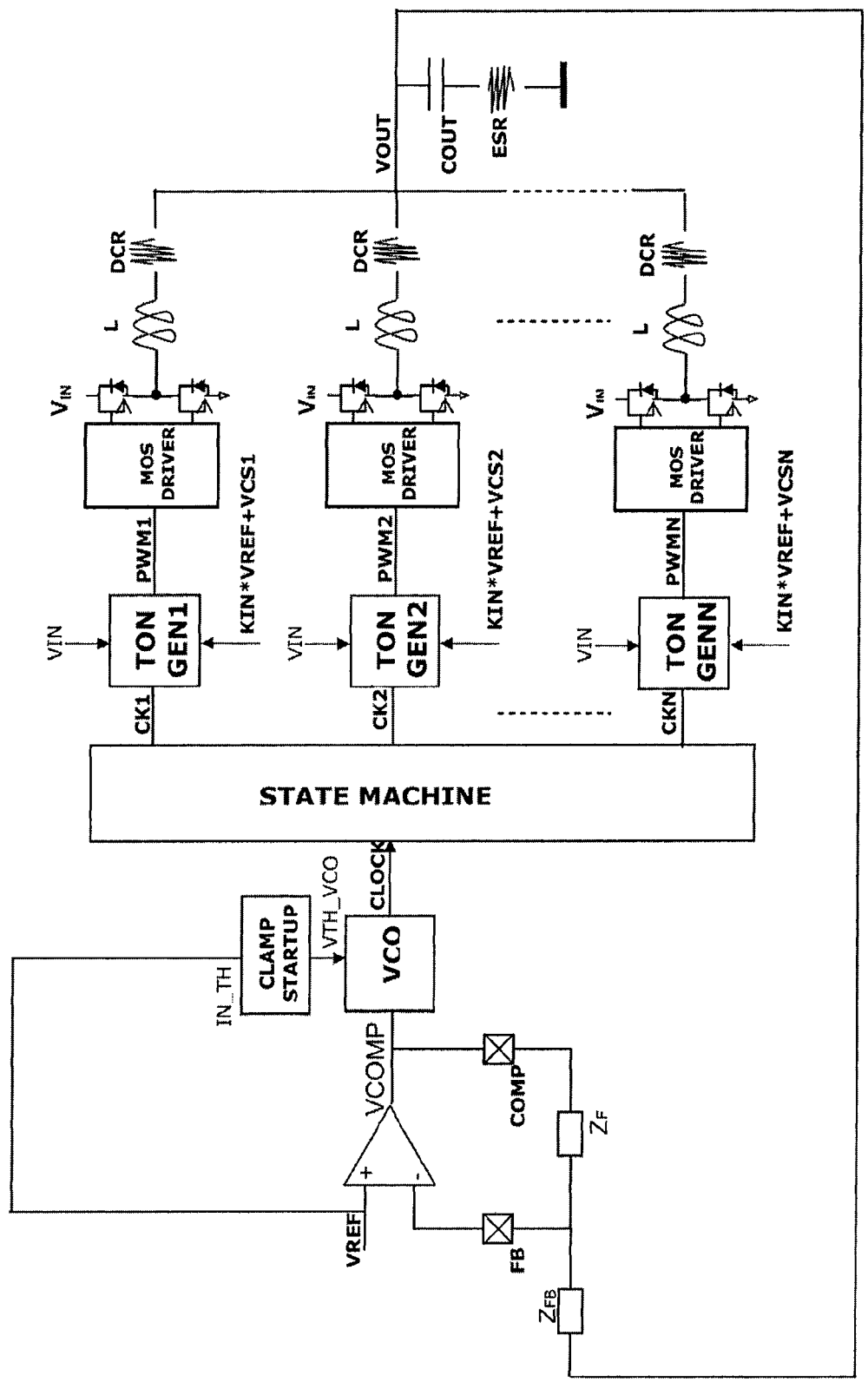

Embodiments of constant on-time N-phase voltage regulators corresponding respectively to the architectures of FIGS. 4 and 5, are shown in FIGS. 13 and 14.

In an embodiment, an N-phase constant on-time switching voltage regulator is driven by a VCO that generates a clock with adjustable frequency corresponding to the voltage provided to the VCO. A state machine STATE MACHINE distributes the clock pulses to the phases by generating as many phase clock signals CKi by frequency division of the clock signal CLOCK. The blocks TON_GEN_i are input with the respective phase clock signals CKi and the sum between the output voltage VOUT and a voltage VCSi representing the unbalance of each phase, and determine, according to well known techniques, the respective phase duty-cycles DUTYi of the respective PWM voltages that supply the phase windings.

In order to make the output voltage VOUT track the reference voltage VREF and to nullify the error in steady-state conditions, an integrating network ZF is connected between the terminals COMP and FB of the switching regulator and a feedback impedance ZFB is connected between the output terminal OUT and the feedback terminal FB.

The regulator has N phases in parallel, thus it is advisable to equalize the phase currents in order to prevent damage to and to prolong the average life of power components. To attain this, numerous current sharing circuits are known in literature, that measure the current flowing throughout each phase, compare it with the average current of the system and correct the on time TON in order to equalize eventual mismatches. These circuits are well known to the skilled persons and for this reason they will not be discussed further.

Figure 15:
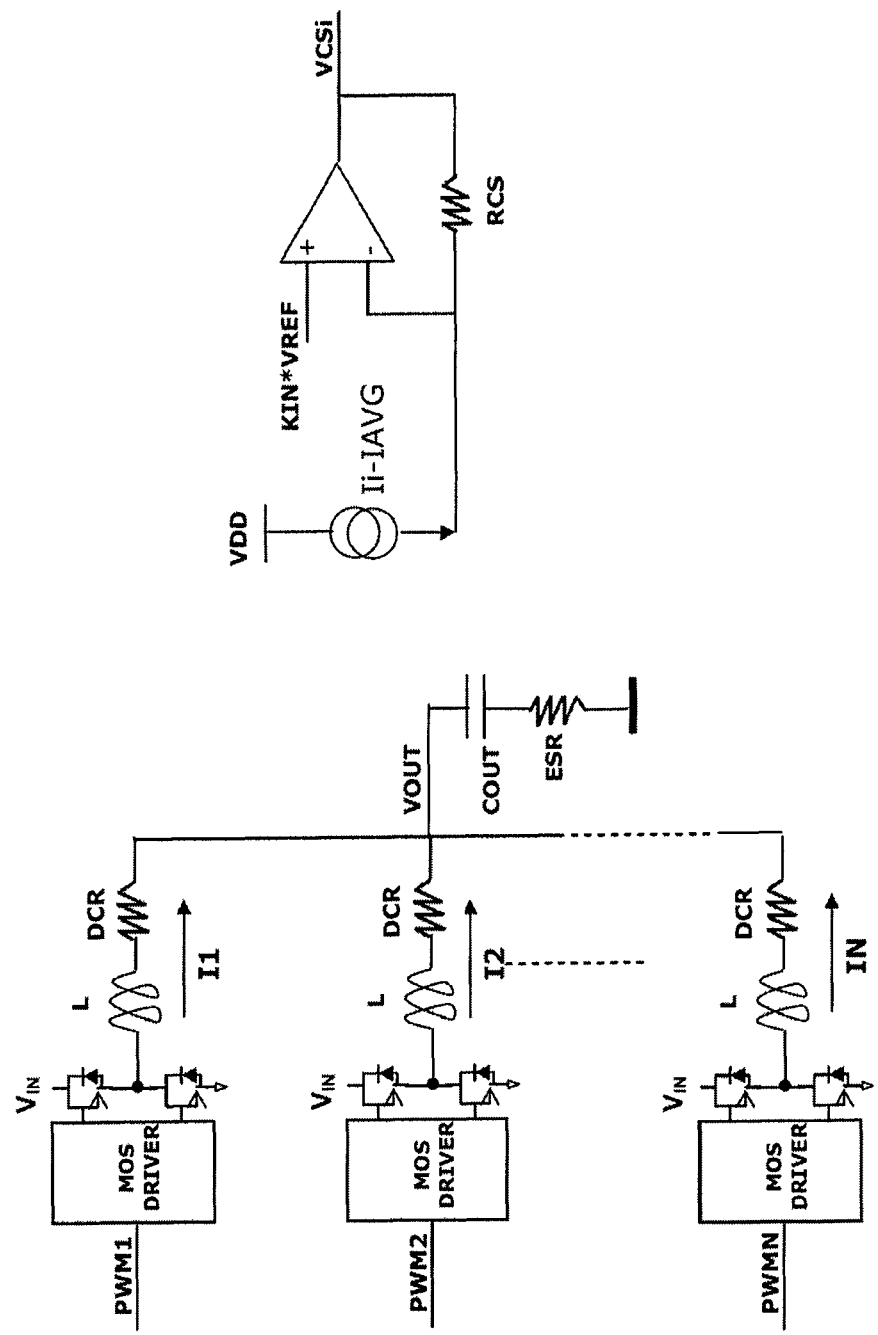
FIG. 15 shows embodiments of circuits to generate a voltage representing the unbalancing current of any phase of the multiphase regulators of FIGS. 13 and 14.
Figure 16:
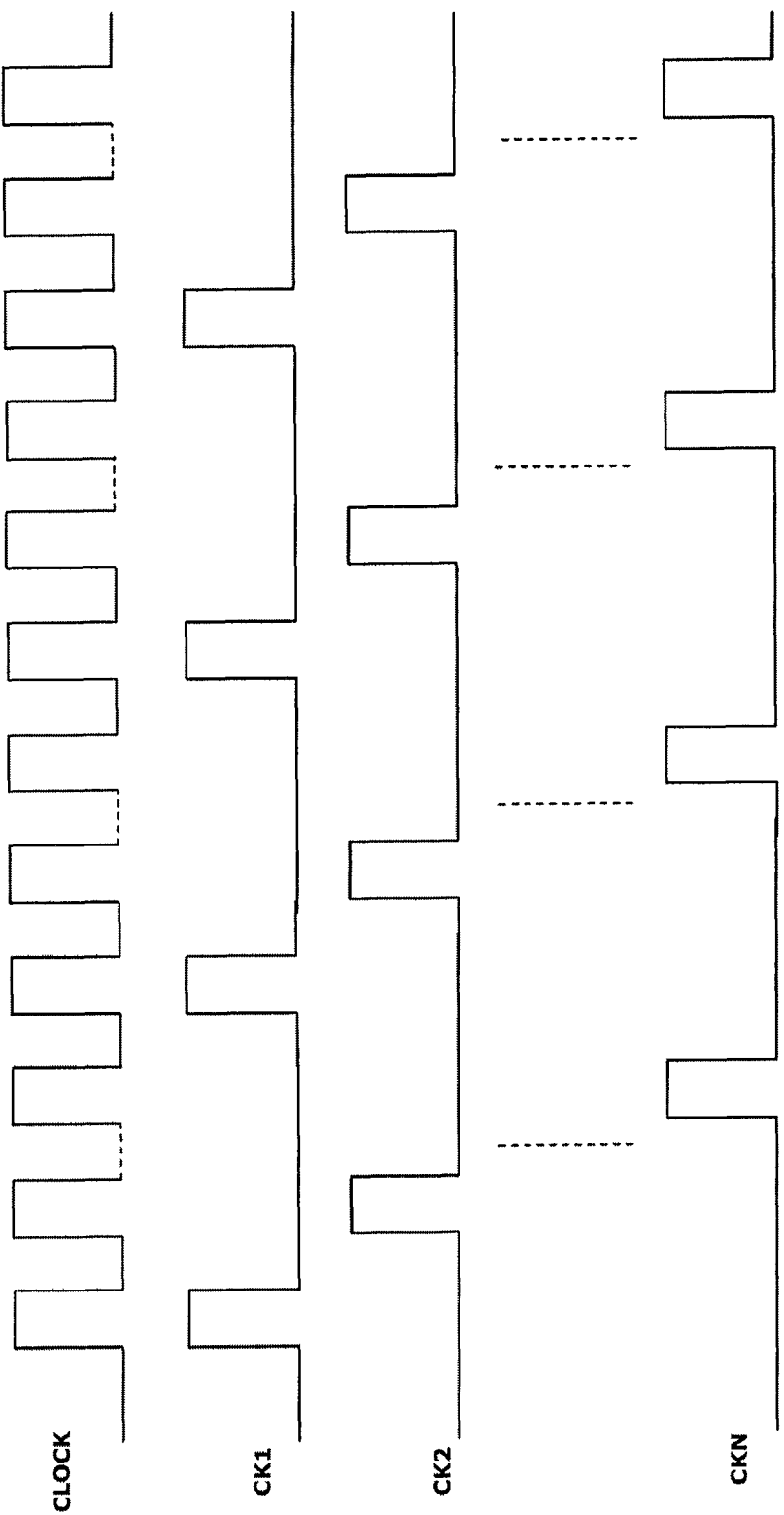
FIG. 16 is a time graph showing an embodiment of how clock pulses may be distributed to the phases of the regulators of FIGS. 13 and 14.

The embodiment of a multi-phase system differs from the embodiment of a monophase system because:

the circuits TON_GENi determine the turn on time for each phase considering also the unbalancing current of the phase concerned, represented by the voltage VCSi generated by a circuit as that depicted in FIG. 15;

there is a logic state machine STATE MACHINE that distributes the turn-on clock provided by the VCO, as shown in FIG. 16. In this case the voltage of the terminal COMP of the VCO of FIG. 8 will be adjusted automatically by the system such to make the VCO oscillate at a frequency N*FSW.

Digital controllers may also be employed in some embodiments. As discussed above, the power supply of the CPU is a field whose complexity is growing. The solution currently adopted is that of multiphase switching regulators, which allow having a good precision of the output voltage and an excellent response to load transients while maintaining a good efficiency. Especially for server applications it is increasingly the widespread use of digital controllers, which allow to have a lot of flexibility and ease in programming and setting up the system (as well as in monitoring) with a very small number of external components compared to some embodiments of analog controllers.

Figure 1:
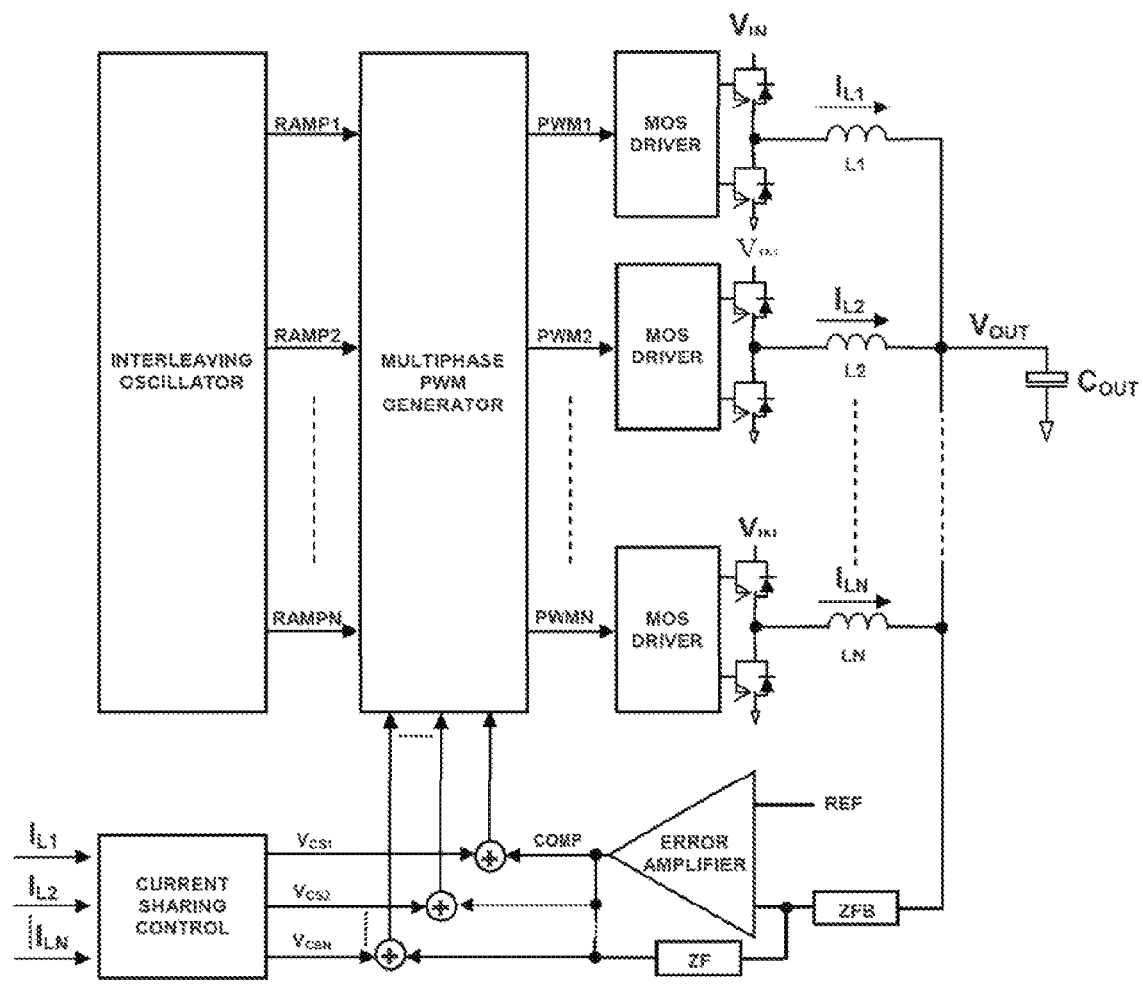
FIG. 1 shows a multi-phase switching voltage regulator and a relative feedback loop.
Figure 2:
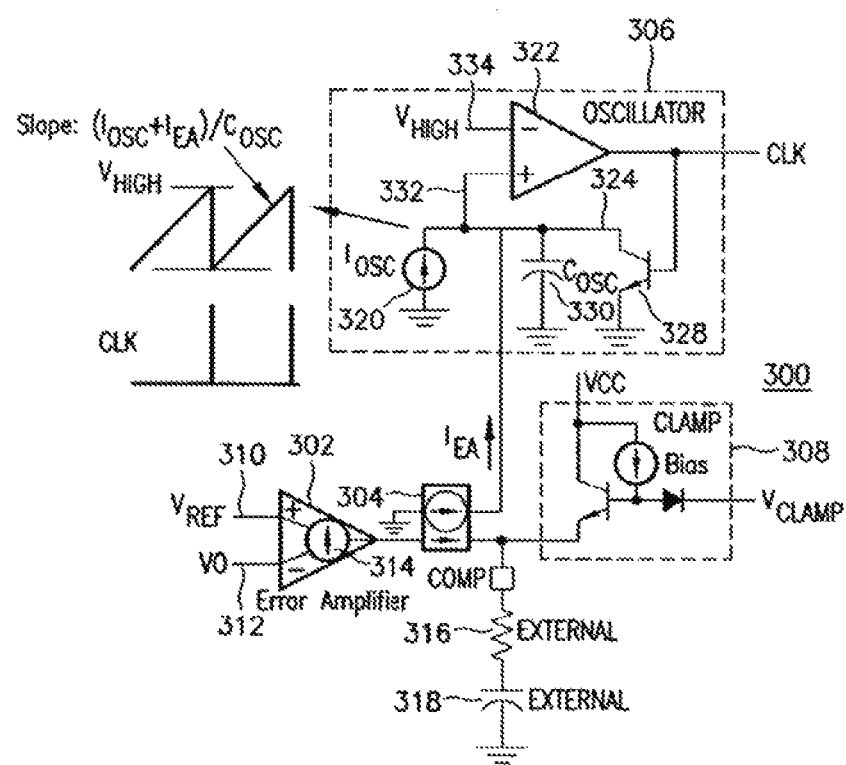
FIG. 2 shows a switching power supply.
Figure 3:
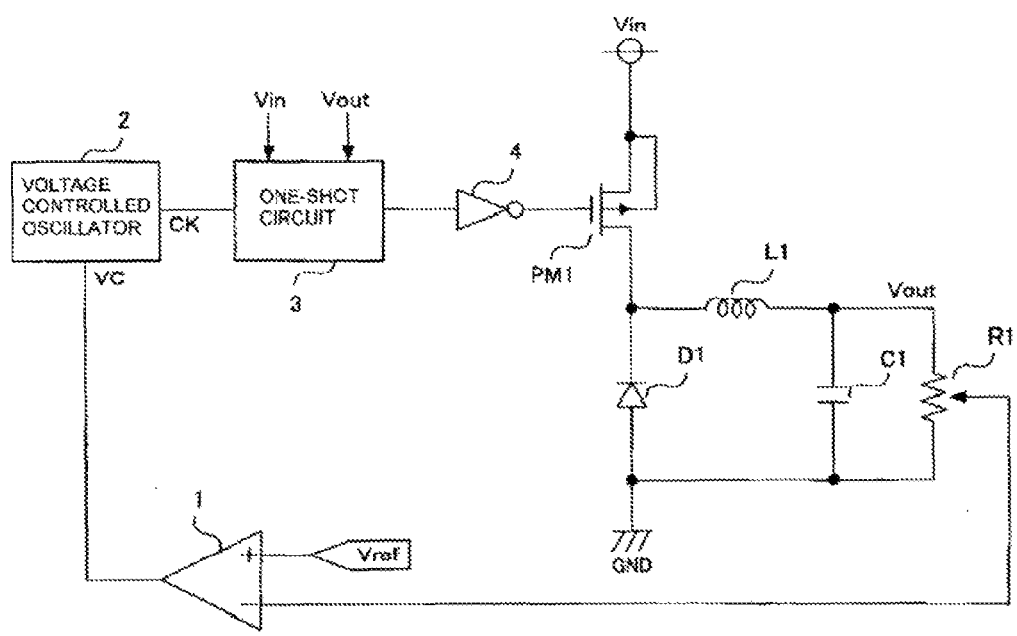
FIG. 3 shows a monophase voltage regulator that implements a PFM control with a turn on time tied to the input or output voltages of the regulator.

One of the most complex problems in the systems of power supply for CPU is the load transient response. In FIG. 1 is shown an example of a 3 phase controller. An example of a transient response is the one implemented by LTB Technology™ (see U.S. Publication No. 2007/0229048 A1 of ST). In this system, as in other solutions of the same generation, the load transient response is nonlinear. Typically a threshold is programmed (in this case on the derivative of the output voltage) and if the transient is detected, the controller will turn on simultaneously all phases. This kind of system was effective on the old processor specification, in which it was assumed a step of load well defined and usually very large and fast (for example: 100 A in 150 ns).

With CPU technology evolution and the new requirements of energy saving this concept is not true anymore: now controllers should be able to respond with the same efficacy even at smaller and/or slower transients. A nonlinear system as LTB is not able to ensure a good response to this type of transient because there is a tripping threshold: it may be that a small transient triggers the non-linear response and causes the simultaneous firing of all phases (although there would be no need), or may not be able to overcome the threshold and then the system will not detect the transient.

If we then carry out tests with repeated transients with entity similar to the triggering threshold of the non-linear response, it may happen that the system responds at times in a linear manner and at times in a nonlinear manner, causing dangerous oscillation on output voltage.

Focusing on digital controllers, some use a control loop at constant frequency and not a constant on-time. About COT (Constant On Time) digital systems, there are articles about classic COT systems (with trigger threshold on Vout) or V2-type.

The inventors have realized that an embodiment of a digital controller similar in some respects to analog controller embodiments discussed herein may be employed. As discussed above, in an embodiment an analog controller comprises an error amplifier (EA) with compensation network followed by a VCO, which determines the frequency of switching through a turn-on threshold on the voltage of the VCO. In this way the noise on the feedback line is filtered by compensation network and VCO, and this is an advantage compared to the classical COT (with a comparator on the Vout). The implementation proposed in VCOT provides that compensation is independent of FSW, VIN and VOUT and the system always has the same gain, and an embodiment of a digital systems also provides compensation independent of FSW, VIN and VOUT.

In an embodiment, the switching frequency of the system is generated, both in steady state and transient condition, using the output of a digital compensator (a PID filter) integrated by an accumulator with variable trigger threshold (function of the reference voltage). The switching frequency is selected based on error information, by appropriately selecting conversion factors of the nominal TON and the threshold of the accumulator. So a voltage regulator with controlled frequency may be obtained which is able to be reactive during load application and load release transients avoiding saturation of the PID output and therefore promoting system stability, making the loop gain constant for a regulated output voltage.

In an embodiment, osc_thr (the tripping threshold of the accumulator) is proportional to the nominal switching period and to the reference voltage (VID) or to the output voltage (VOUT).

At this point it is useful to consider an analog embodiment discussed above and analyze a possible digital implementation.

First of all, an embodiment of an analog system comprised an error amplifier with a compensation network that generated the voltage VCOMP. In the digital implementation of an embodiment the error voltage is digitized by an ADC. The output of the ADC is filtered by a PID filter that follows the transfer function of the compensation network of the Error Amplifier and returns the digital value Dcomp, which will match the value VCOMP unless for the conversion factor of Verr from analog to digital (i.e. the LSB of the ADC).

We can write: Dcomp VCOMP/LSBadc_err.

In an embodiment of an analog system, VCOMP voltage is then converted into a current, this current is integrated on a capacitor and the resultant voltage is compared to a threshold equal to the value of the reference voltage (Vvid) or to the output voltage (Vout).

The overcoming of the threshold determines the turning on of a phase.

Figure 17:
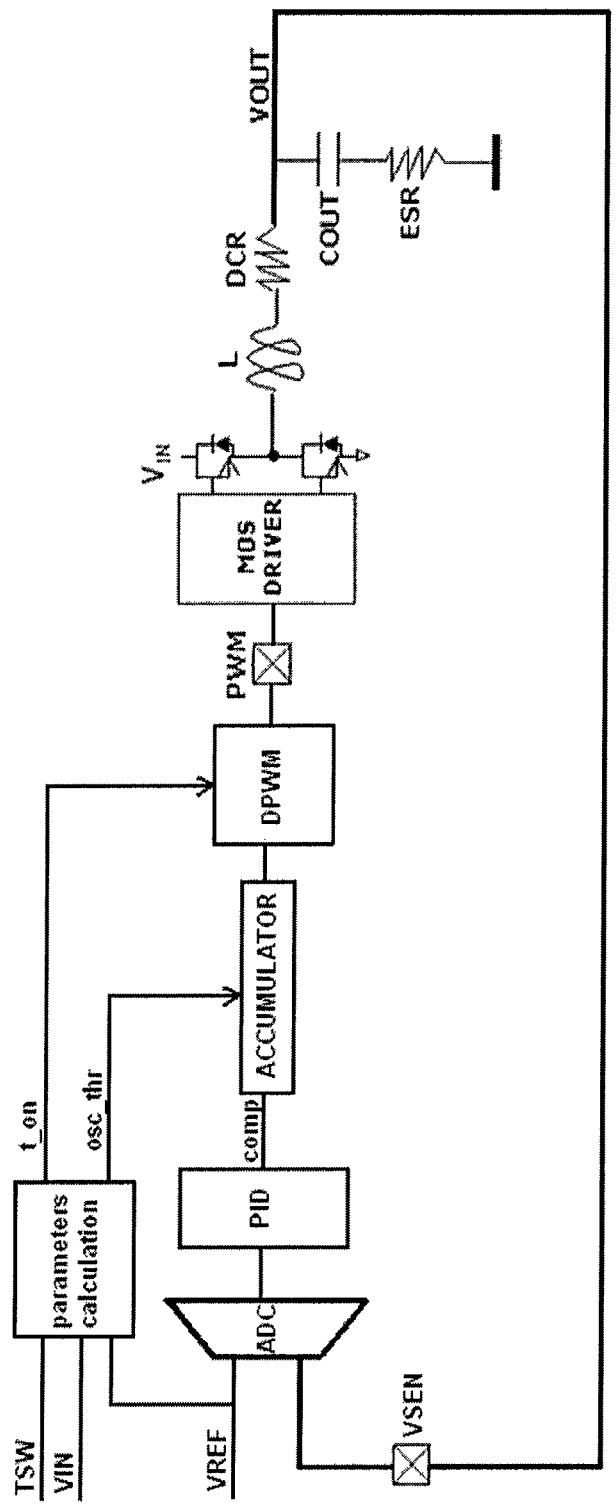
FIG. 17 illustrates an embodiment of a digital constant-on-time voltage regulator.

Now we analyze an embodiment employing the reference voltage (shown in FIG. 17), and then extend the results for an embodiment in which Vout is used.

The VCO relationship in an embodiment of an analog system is:

$$Vvid = \int \frac{Vcomp(t)}{Kosc * Tsw} dt$$

In digital domain we can write:

$Vvid = LSB\_vid * Dvid$ where LSB_vid is the voltage value of the least significant bit (LSB) of the digital-to-analog converter (DAC) generating the reference voltage, and Dvid is the digital value sent to the DAC.

As discussed above, Vcomp=Dcomp*LSBadc_err (transfer function from the ADC to Dcomp is equivalent to analog).

$Tsw = Nsw * Tclk$ where Tck is the clock period of the PID filter.

Then:

$$LSB\_vid * Dvid = \int \frac{LSBadc\_err * Dcomp}{Kosc * Nsw * Tclk} dt$$

$$\frac{LSB\_vid * Dvid * Kosc * Nsw}{LSBadc\_err} = \int \frac{Dcomp}{Tclk} dt$$

Since there is no analog integration, but a discrete adder with time period Tclk, we can write:

$$\frac{\text{LSB\_vid} * Dvid * Kosc * Nsw}{\text{LSBadc\_err}} = \sum Dcomp$$

This means that the accumulator will continue to add the value of the Dcomp until reaching the threshold. At that point a DPWM is generated and the accumulator is reset.

In a digital implementation, to avoid the limit cycle issue, it is useful to provide that the instant of turning on the phase with high resolution (more than the clock period Tck), and so a calculation of a more precise instant for the firing has been implemented (fraction of Tck) to control the DPWM (as known in the literature, the block that generates the PWM signal, with a suitable resolution).

For what concerns the calculation of the accumulator's threshold, the two variable parameters are Dvid (which varies dynamically during operation) and Nsw (which is a system parameter, e.g., the nominal switching period). The other three terms are generally fixed by hardware (LSB_vid, LSBadc_err, Kosc).

Writing:

$$Kea = \text{LSB}adc\_err/(\text{LSB}\_vid*Kosc)$$

The threshold of the oscillator may be calculated:

$$osc\_thr = Dvid*Nsw/Kea$$

As in the analog implementation, it is desirable to provide a minimum value of the threshold in order to facilitate the system starting even when the reference is low (e.g., during the system's soft start). In this case, for the calculation of the threshold, the maximum between Dvid and Dvid_min, where Dvid_min corresponds to a voltage value lower than the minimum operating voltage (for example, it could correspond to 300 mV) is employed.

The working value of Dcomp in an embodiment may be determined as follows.

Considering the case of nominal Tsw, $$\sum Dcomp = Dcomp_{DC} * Nsw$$

$$\frac{Dvid * Nsw}{Kea} = Dcomp_{DC} * Nsw$$

The DC value of Dcomp is:

$$Dcomp_{DC} = \frac{Dvid}{Kea}$$

From the theory of buck controllers, the ideal TON is:

$$Ton = Tsw * \frac{Vout}{Vin}$$

Since this is a Constant On-Time based controller, the Ton may be calculated in advance, and in the block that performs the calculation, according to the threshold of the accumulator, we may approximate Vout with Vvid=LSB_vid*Dvid.

So if we calculate the transfer function of PWM/Dcomp we find out that:

$$\frac{PWM}{Dcomp} = \frac{Ton/Tsw}{Dvid/Kea} = \frac{\text{LSB}\_vid * Dvid/Vin}{Dvid/Kea} = \frac{\text{LSB}\_vid * Kea}{Vin}$$

This means that the system gain may be independent from the voltage adjustment. This is due to the fact that the threshold of the accumulator is generated proportional to the reference voltage.

Since the transfer function from the PWM to Vout provides a multiplying by Vin (DC gain of the power stage), a constant gain is obtained.

Figure 18:
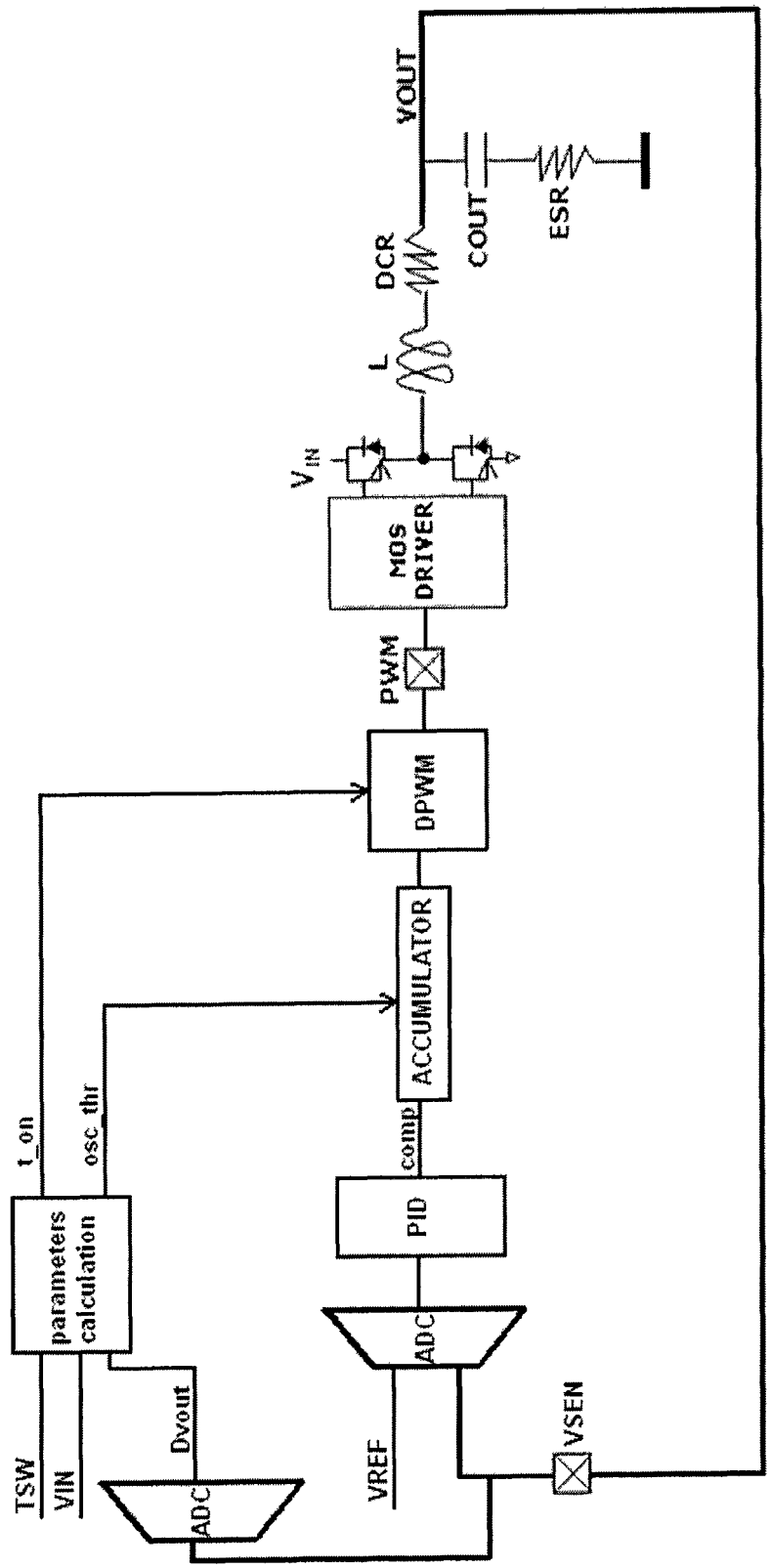
FIG. 18 illustrates an embodiment of a digital constant-on-time voltage regulator.

Another possible implementation (more precise but also more expansive) involves the use of Vout instead of Vref in the block that calculates the Ton and the accumulator's threshold. The block diagram of an embodiment is shown in FIG. 18.

Assuming that you convert digital Vout with a dedicated ADC, with $$Vout = Dvout * \text{LSB}adc\_vout$$

The relationship becomes:

$$\frac{\text{LSBadc\_vout} * Dvout * Kosc * Nsw}{\text{LSBadc\_err}} = \sum Dcomp$$

And then:

$$Kea = \text{LSB}adc\_err/(\text{LSB}adc\_vout*Kosc)$$

$$osc\_thr = Dvout*Nsw/Kea$$

And the DC of Dcomp value in steady state condition is:

$$Dcomp_{DC} = \frac{Dvout}{Kea}$$

The Ton may be generated as a function of the converted value of Vout to obtain independence of the gain from the output voltage adjustment:

$$Ton = Tsw * \frac{\text{LSBadc\_vout} * Dvout}{Vin}$$

$$\frac{PWM}{Dcomp} = \frac{Ton/Tsw}{Dvid/Kea}$$
$$= \frac{\text{LSBadc\_vout} * Dvout/Vin}{Dvout/Kea}$$
$$= \frac{\text{LSBadc\_vout} * Kea}{Vin}$$

This method may be extended to a system with N phases. In this case, the threshold osc_thr may be set to the same value, and the Dcomp is led to a value N times bigger (since it employs an equivalent switching frequency N times larger). When the accumulator exceeds the threshold once again the event generates a pulse of start_pwm which will be routed to various DPWM from the block called interleaving to manage the firing sequence of the various phases.

Figure 19:
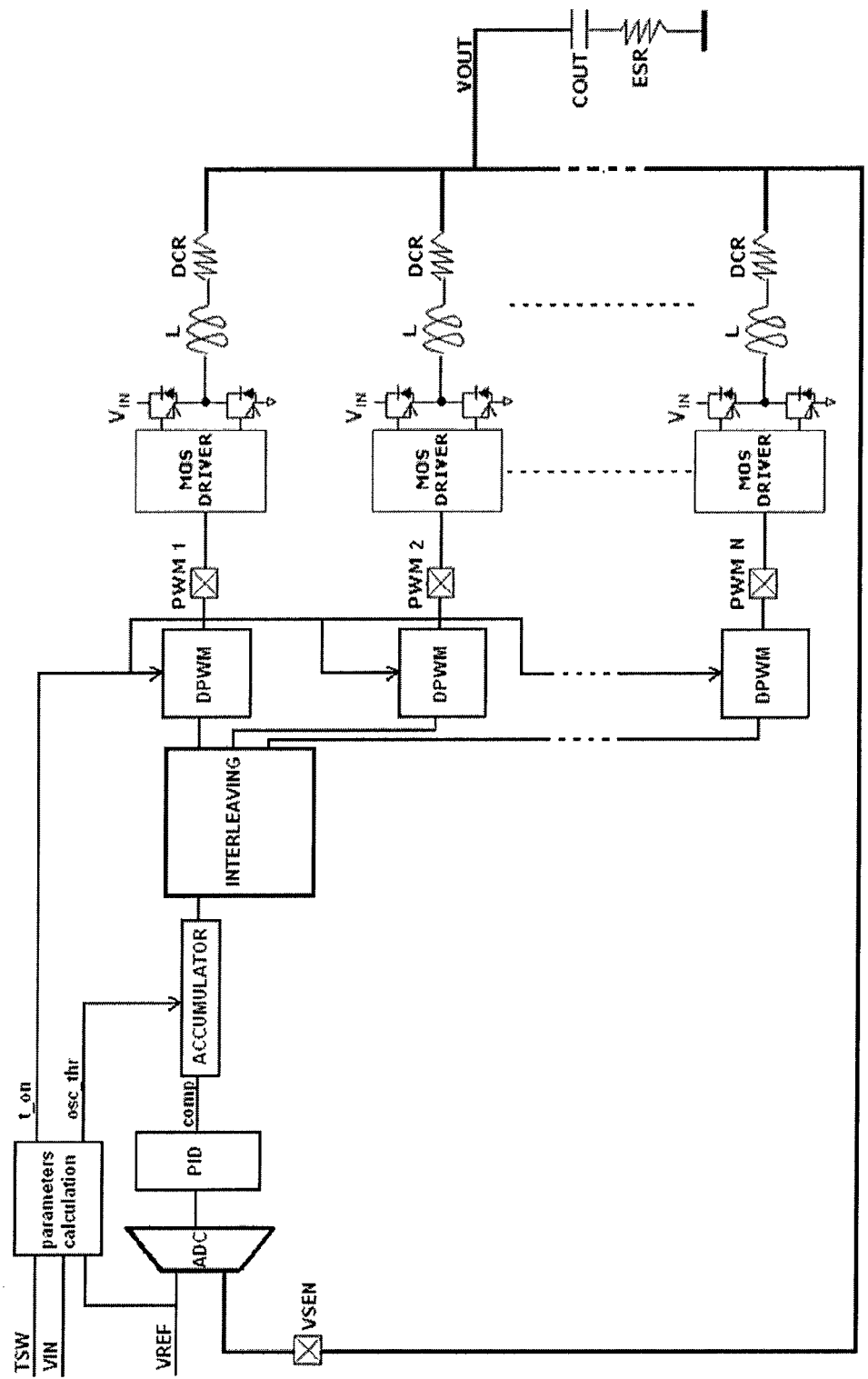
FIG. 19 illustrates an embodiment of a digital constant-on-time voltage regulator.
Figure 20:
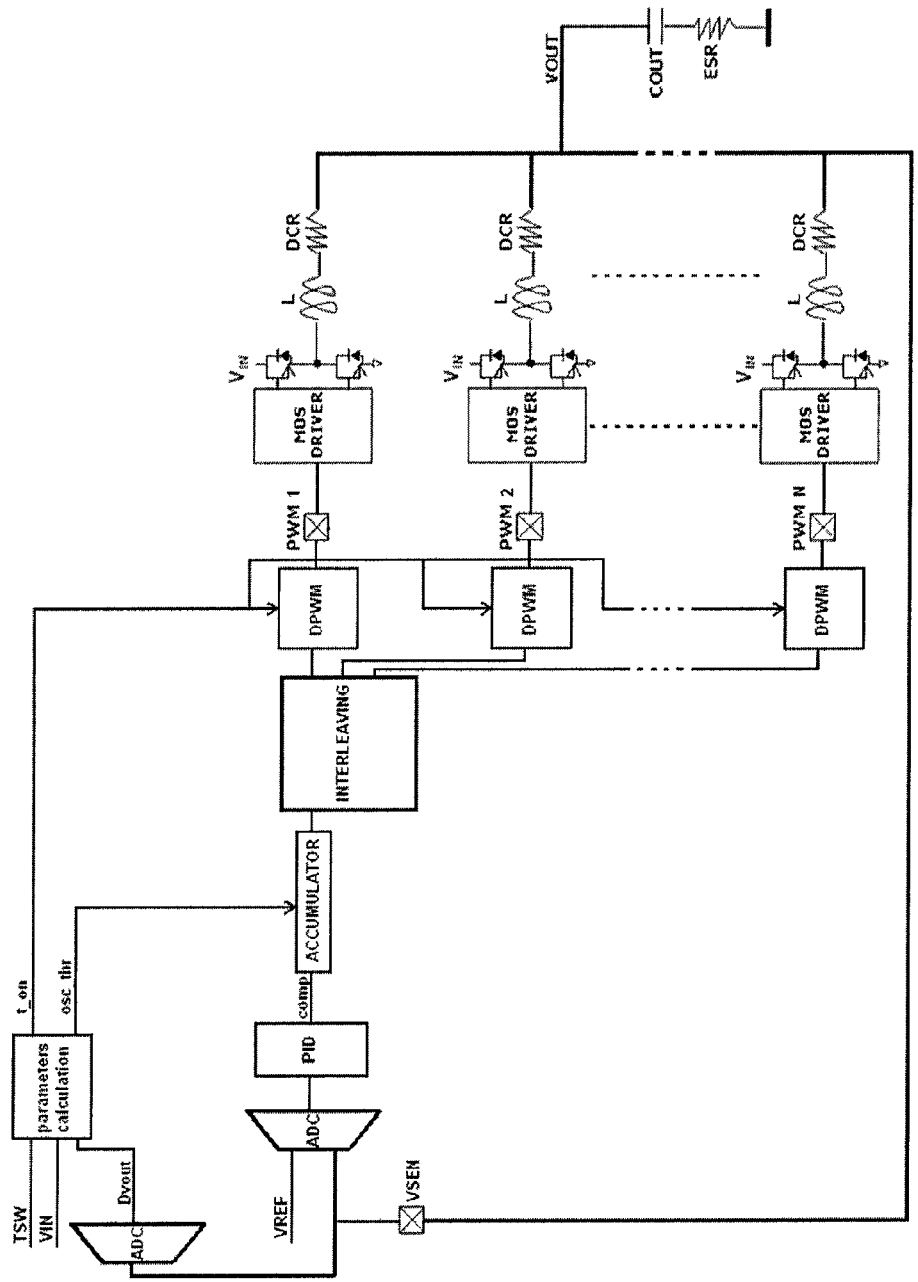
FIG. 20 illustrates an embodiment of a multiphase digital constant-on-time voltage regulator.
Figure 21:
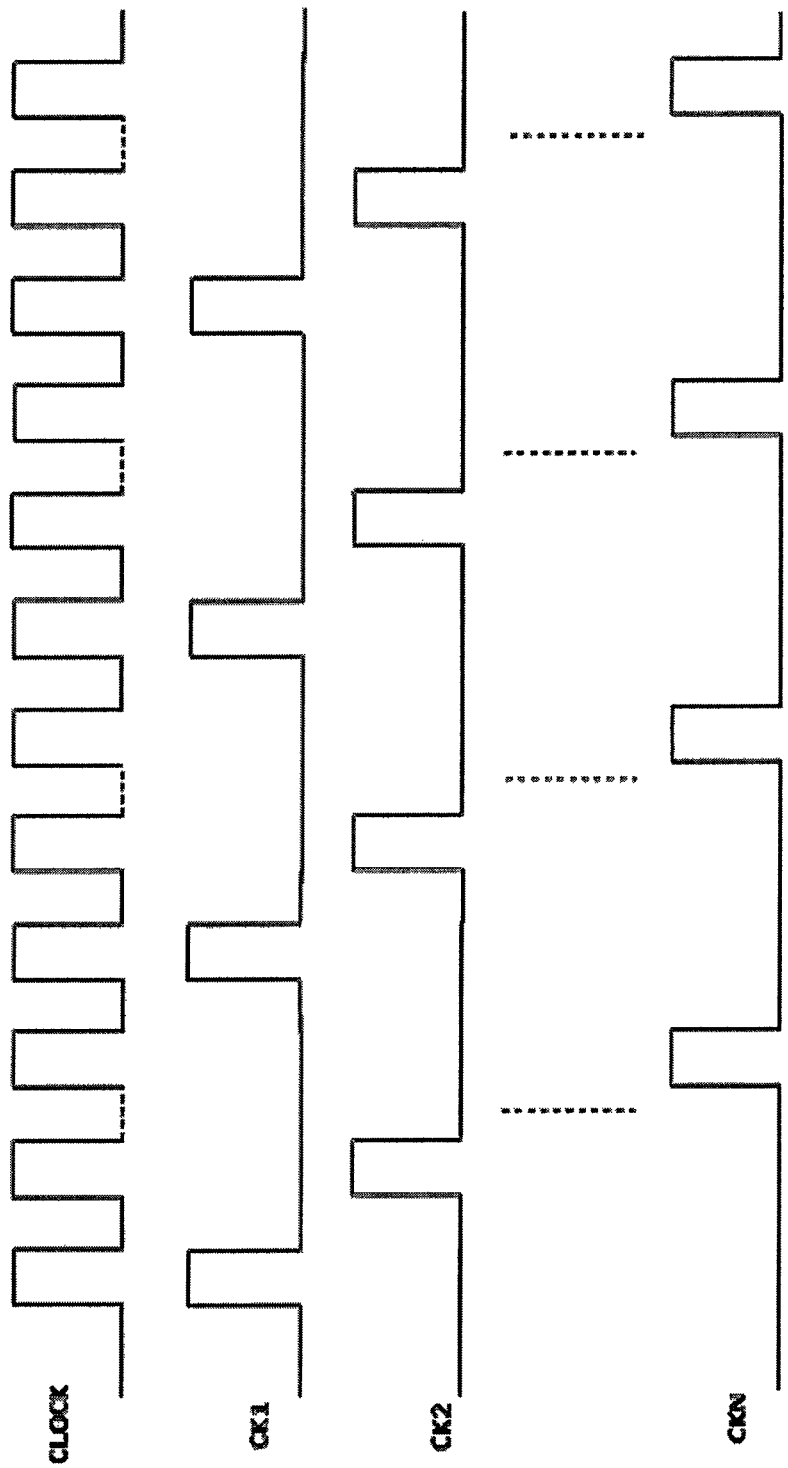
FIG. 21 is a time graph showing an embodiment of how clock pulses may be distributed in an embodiment.

The two implementations previously proposed, extended to N phases, are shown in FIGS. 19 and 20, while in FIG. 21 there is an example of the behaviour of the interleaving.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A switching voltage regulator, comprising:
a comparison module configured to receive a reference voltage and a feedback voltage and to generate a comparison signal based on a difference between the reference voltage and the feedback voltage;
at least one pulse-width modulated (PWM) power stage; and
a control module configured to:
generate a gain control threshold signal based on at least one of the reference voltage and the feedback voltage; and
control a switching frequency of the at least one PWM power stage based at least in part on the comparison signal and on the gain control threshold signal, wherein a change in the switching frequency in response to a transient in a regulated output voltage is proportional to the comparison signal.

2. The switching voltage regulator of claim 1 wherein the control module is configured to control a duration of a PWM pulse based on the at least one of the reference voltage and the feedback voltage.

3. The switching voltage regulator of claim 1 wherein the feedback voltage is a regulated output voltage of the switching voltage regulator.

4. The switching voltage regulator of claim 1 wherein the comparison signal is a comparison voltage and the comparison module comprises an error amplifier configured to receive the reference voltage and the feedback voltage and to generate the comparison voltage.

5. The switching voltage regulator of claim 4 wherein the control module comprises:
a voltage controlled oscillator configured to generate a train of pulses at a frequency determined by said comparison voltage and having a gain based on the gain control threshold signal.

6. The switching voltage regulator of claim 5 wherein the control module further comprises a generator of PWM pulses configured to drive the at least one PWM power stage and a duration of the PWM pulses generated is based on the at least one of the reference voltage and the feedback voltage.

7. The switching voltage regulator of claim 6, comprising a feedback impedance coupled between an output terminal of the regulator and a feedback terminal of the error amplifier, and an integrating impedance coupled between the feedback terminal and an output terminal of the error amplifier.

8. A switching voltage regulator, comprising:
a comparison module configured to receive a reference voltage and a feedback voltage and to generate a comparison signal based on a difference between the reference voltage and the feedback voltage;
at least one pulse-width modulated (PWM) power stage; and
a control module configured to:
generate a gain control threshold signal based on at least one of the reference voltage and the feedback voltage; and
control a switching frequency of the at least one PWM power stage based at least in part on the comparison signal and on the gain control threshold signal, wherein the control module includes a voltage controlled oscillator configured to generate a train of pulses at a frequency determined by said comparison voltage and having a gain based on the gain control threshold signal and a start-up block configured to receive the at least one of the reference voltage and the feedback voltage and to provide the gain control threshold signal to the voltage controlled oscillator, the gain control threshold signal being a largest of a minimum triggering threshold signal and the at least one of the reference voltage and the feedback voltage.

9. A switching voltage regulator, comprising:
a comparison module configured to receive a reference voltage and a feedback voltage and to generate a comparison signal based on a difference between the reference voltage and the feedback voltage;
at least one pulse-width modulated (PWM) power stage; and
a control module configured to:
generate a gain control threshold signal based on at least one of the reference voltage and the feedback voltage; and
control a switching frequency of the at least one PWM power stage based at least in part on the comparison signal and on the gain control threshold signal, wherein,
the at least one PWM power stage comprises a plurality of PWM power stages;

the feedback voltage is a regulated output voltage of the switching voltage regulator;

the comparison signal is a comparison voltage and the comparison module includes an error amplifier configured to receive the reference voltage and the feedback voltage and to generate the comparison voltage; and the control module includes:

a voltage controlled oscillator configured to generate a train of pulses at a frequency determined by said comparison voltage and having a gain based on the gain control threshold signal;

a plurality of PWM pulse generators configured to generate PWM pulses to drive respective PWM power stages of the plurality of PWM power stages wherein a duration of the PWM pulses is based on the at least one of the reference voltage and the feedback voltage;

a start-up block configured to receive the at least one of the reference voltage and the feedback voltage and to provide the gain control threshold signal to the voltage controlled oscillator, the gain control threshold signal being a largest of a minimum triggering threshold signal and the at least one of the reference voltage and the feedback voltage; and a state machine configured to receive the train of pulses generated by said voltage controlled oscillator and to generate for each of said PWM pulse generators a respective train of pulses obtained by frequency division of said train of pulses generated by the voltage controlled oscillator.

10. A switching voltage regulator, comprising:

a comparison module configured to receive a reference voltage and a feedback voltage and to generate a comparison signal based on a difference between the reference voltage and the feedback voltage;

at least one pulse-width modulated (PWM) power stage; and a control module configured to:

generate a gain control threshold signal based on at least one of the reference voltage and the feedback voltage; and control the at least one PWM power stage based at least in part on the comparison signal and on the gain control threshold signal, wherein, the at least one PWM power stage comprises a plurality of PWM power stages each having a PWM pulse generator;

the comparison module comprises:

a first analog-to-digital converter configured to receive the reference voltage and the feedback voltage; and a first proportional-integral-derivative (PID) controller configured to receive an output of the first analog-to-digital converter and to generate the comparison signal; and the control module comprises:

an accumulator configured to generate a train of pulses at a frequency based on the comparison signal, wherein the gain control threshold signal is a tripping threshold of the accumulator; and an interleaving oscillator configured to generate a plurality of pulse trains based on the train of pulses generated by the accumulator.

11. The switching voltage regulator of claim 10 wherein the PWM pulse generators are configured to generate PWM pulses having a duration based on the at least one of the reference voltage and the feedback voltage.

12. The switching voltage regulator of claim 10 wherein gain control reference signal is proportional to the at least one of the reference voltage and the feedback voltage.

13. The switching voltage regulator of claim 12 wherein the control module comprises a parameter generator configured to receive the reference voltage and to output the gain control threshold signal.

14. The switching voltage regulator of claim 13 wherein the parameter generator is configured to output a pulse duration control signal based on the reference voltage signal.

15. The switching voltage regulator of claim 12 wherein the control module comprises:

a second analog-to-digital converter configured to receive the feedback voltage and to generate a control signal based on the feedback voltage; and a parameter generator configured to receive the control signal generated by the second analog-to-digital converter and to output the gain control threshold signal.

16. The switching voltage regulator of claim 15 wherein the parameter generator is configured to output a pulse duration control signal based on the control signal generated by the second analog-to-digital converter.

17. The switching voltage regulator of claim 10 wherein the gain control threshold signal is a largest of a minimum triggering threshold signal and the at least one of the reference voltage and the feedback voltage.

18. A method, comprising:

generating a regulated voltage which tracks a reference voltage using a constant-on-time switching voltage regulator, by:

generating a comparison signal based on the reference voltage and a feedback voltage;

generating a gain control threshold signal based on at least one of the reference voltage and the feedback voltage; and controlling the voltage regulator based at least in part on the comparison signal and on the gain control threshold signal, the controlling including controlling a switching frequency of the voltage regulator, wherein a change in the switching frequency in response to a transient in the regulated output voltage is proportional to the comparison signal.

19. The method of claim 18 wherein the controlling the voltage regulator comprises:

controlling a duration of pulse width modulated (PWM) pulses based on the at least one of the reference voltage and the feedback voltage.

20. The method of claim 18 wherein the feedback voltage is the regulated output voltage of the switching voltage regulator.

21. The method of claim 18, comprising:

generating a train of pulses at a frequency based on the comparison signal using a voltage controlled oscillator having a gain based on the gain control threshold signal; and generating a plurality of PWM pulses to drive respective PWM power stages of the switching voltage regulator, wherein a duration of the PWM pulses is based on the at least one of the reference voltage and the feedback voltage.

22. A method, comprising:

generating a regulated voltage which tracks a reference voltage using a constant-on-time switching voltage regulator, by:

generating a comparison signal based on the reference voltage and a feedback voltage;

generating a gain control threshold signal based on at least one of the reference voltage and the feedback voltage; and controlling the voltage regulator based at least in part on the comparison signal and on the gain control threshold signal, wherein the generating the gain control threshold signal comprises selecting a largest of a minimum triggering threshold signal and the at least one of the reference voltage and the feedback voltage.

23. A method, comprising:

generating a regulated voltage which tracks a reference voltage using a constant-on-time switching voltage regulator, by:

generating a comparison signal based on the reference voltage and a feedback voltage;

generating a gain control threshold signal based on at least one of the reference voltage and the feedback voltage; and controlling the voltage regulator based at least in part on the comparison signal and on the gain control threshold signal, the controlling including controlling a switching frequency of the voltage regulator, wherein the voltage regulator comprises, a first analog-to-digital converter configured to receive the reference voltage and the feedback voltage;

a first proportional-integral-derivative (PID) controller configured to receive an output of the first analog-to-digital converter and to generate the comparison signal; and an accumulator configured to generate a train of pulses at a frequency based on the comparison signal, wherein the generating the gain control threshold signal comprises generating a tripping threshold of the accumulator.

24. A system, comprising:

a processor; and a switching voltage regulator configured to provide power to the processor and including:

means for generating a comparison signal based on a reference voltage and a feedback voltage;

means for generating a gain control threshold signal based on at least one of the reference voltage and the feedback voltage; and means for controlling a switching frequency of the switching voltage regulator based on the comparison signal and the gain control threshold signal, wherein a change in the switching frequency in response to a transient in a regulated output voltage of the switching voltage regulator is proportional to the comparison signal.

25. The system of claim 24 wherein the switching voltage regulator comprises means for generating a pulse width modulated (PWM) pulse duration control signal based on the at least one of the reference voltage and the feedback voltage.

26. The system of claim 24 wherein the feedback voltage is the regulated output voltage of the switching voltage regulator.

27. The system of claim 26 wherein, the switching voltage regulator comprises a plurality of PWM power stages and a voltage controlled oscillator having a gain based on the gain control threshold signal; and the comparison signal is a comparison voltage and the means for generating the comparison signal includes an error amplifier configured to receive the reference voltage and the feedback voltage and to generate the comparison voltage.

28. The system of claim 24 wherein the means for generating the gain control threshold signal is configured to receive the at least one of the reference voltage and the feedback voltage and to provide the gain control threshold signal to a voltage controlled oscillator, the gain control threshold signal being a largest of a minimum triggering threshold signal and the at least one of the reference voltage and the feedback voltage.

29. A system, comprising:

a processor; and a switching voltage regulator configured to provide power to the processor and including:

means for generating a comparison signal based on a reference voltage and a feedback voltage;

means for generating a gain control threshold signal based on at least one of the reference voltage and the feedback voltage; and means for controlling a switching frequency of the switching voltage regulator based on the comparison signal and the gain control threshold signal, wherein the switching voltage regulator comprises:

a plurality of PWM power stages each having a PWM pulse generator;

a first analog-to-digital converter configured to receive the reference voltage and the feedback voltage;

a first proportional-integral-derivative (PID) controller configured to receive an output of the first analog-to-digital converter and to generate the comparison signal;

an accumulator configured to generate a train of pulses at a frequency based on the comparison signal, wherein the gain control threshold signal is a tripping threshold of the accumulator; and an interleaving oscillator configured to generate a plurality of pulse trains based on the train of pulses generated by the accumulator.

* * * * *